United States Patent
Kim et al.

(10) Patent No.: US 10,033,925 B2
(45) Date of Patent: Jul. 24, 2018

(54) MOBILE TERMINAL AND METHOD OF CONTROLLING THE SAME

(71) Applicant: LG Electronics Inc., Seoul (KR)

(72) Inventors: Sungjin Kim, Seoul (KR); Taehoon Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 285 days.

(21) Appl. No.: 14/936,404

(22) Filed: Nov. 9, 2015

(65) Prior Publication Data

US 2016/0373650 A1    Dec. 22, 2016

(30) Foreign Application Priority Data

Jun. 16, 2015  (KR) .................. 10-2015-0085353

(51) Int. Cl.
| | | |
|---|---|---|
| *G03B 27/00* | (2006.01) | |
| *H04N 5/232* | (2006.01) | |
| *G06T 3/40* | (2006.01) | |
| *H04M 1/02* | (2006.01) | |
| *H04N 5/262* | (2006.01) | |

(52) U.S. Cl.
CPC ....... *H04N 5/23238* (2013.01); *G06T 3/4038* (2013.01); *H04M 1/0264* (2013.01); *H04N 5/23216* (2013.01); *H04N 5/23293* (2013.01); *H04N 5/2624* (2013.01); *G06T 2200/32* (2013.01)

(58) Field of Classification Search
None
See application file for complete search history.

(56) References Cited

U.S. PATENT DOCUMENTS

2007/0160311 A1*  7/2007  Edwards .............. H04N 1/3876
                                                     382/284
2011/0110605 A1    5/2011  Cheong
(Continued)

FOREIGN PATENT DOCUMENTS

JP    2005-229290 A    8/2005
JP    2013-141155 A    7/2013
(Continued)

OTHER PUBLICATIONS

"How to take a panoramic photo with iOS 6" Cipriani, Jason. CNET Culture. Published Sep. 19, 2012. URL: https://www.cnet.com/how-to/how-to-take-a-panoramic-photo-with-ios-6/. Accessed Oct. 23, 2017.*

*Primary Examiner* — Kevin McInnish
(74) *Attorney, Agent, or Firm* — Birch, Stewart, Kolasch & Birch, LLP

(57) ABSTRACT

A mobile terminal including a main body; a camera mounted in the main body and configured to capture an external environment; a display unit configured to display an image obtained by the camera in real time; a sensing unit configured to sense a motion of the main body while the camera is activated; a memory configured to store therein the image displayed on the display unit in response to a capture control command being applied; and a controller configured to generate a processed image formed by continuous images displayed on the display unit when the motion of the main body forms a continuous virtual track while displaying the image.

16 Claims, 30 Drawing Sheets

(56) References Cited

U.S. PATENT DOCUMENTS

| | | | |
|---|---|---|---|
| 2012/0194637 A1* | 8/2012 | Han | H04N 5/23232 348/36 |
| 2012/0294549 A1* | 11/2012 | Doepke | G06T 3/4038 382/294 |
| 2012/0313897 A1 | 12/2012 | Sasaki | |
| 2013/0093840 A1 | 4/2013 | Ichikawa et al. | |
| 2013/0229484 A1* | 9/2013 | Furumura | H04N 5/23238 348/36 |
| 2015/0244944 A1* | 8/2015 | Tokutake | H04N 5/23296 348/239 |
| 2016/0026871 A1* | 1/2016 | Wexler | H04N 5/2257 382/103 |

FOREIGN PATENT DOCUMENTS

| | | |
|---|---|---|
| JP | 2014-68081 A | 4/2014 |
| KR | 10-2000-0058739 A | 10/2000 |
| KR | 10-2014-0009489 A | 1/2014 |

\* cited by examiner

MOBILE TERMINAL AND METHOD OF CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2015-0085353, filed on Jun. 16, 2015, the contents of which is incorporated by reference herein in its entirety.

BACKGROUND OF THE DISCLOSURE

1. Field of the Disclosure

This specification relates to a mobile terminal having a camera for capturing an object in a continuous manner.

2. Background of the Disclosure

Terminals may be divided into glass type terminals (mobile/portable terminals) and stationary terminals. Also, the glass type terminals may be classified into handheld terminals and vehicle mounted terminals. As it becomes multi-functional, a mobile terminal can capture still images or moving images, play music or video files, play games, receive broadcast and the like, so as to be implemented as an integrated multimedia player. Many efforts include not only changes and improvement of structural components implementing a mobile terminal, but also software improvement to support and improve functions of the terminal.

A camera installed in a mobile terminal performs various functions, and a user has to apply distinguishable control commands to perform those functions. Also, a clear image capturing is interrupted when applying a touch for changing a function while generating an image through the camera, and the user suffers from having to remember all of various control commands.

SUMMARY OF THE DISCLOSURE

Therefore, an aspect of the detailed description is to provide a mobile terminal capable of generating a processed image by capturing continuous images without a specific control command.

To achieve these and other advantages and in accordance with the purpose of this specification, as embodied and broadly described herein, the present invention provides a mobile terminal including a main body; a camera mounted in the main body and configured to capture an external environment; a display unit configured to display an image obtained by the camera in real time; a sensing unit configured to sense a motion of the main body while the camera is activated; a memory configured to store therein the image displayed on the display unit in response to a capture control command being applied; and a controller configured to generate a processed image formed by continuous images displayed on the display unit when the motion of the main body forms a continuous virtual track while displaying the image. The present invention also provides a corresponding method of controlling the mobile terminal.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate embodiments and together with the description serve to explain the principles of the disclosure.

In the drawings.

DETAILED DESCRIPTION OF THE DISCLOSURE

Description will now be given in detail according to embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Figure 1A:
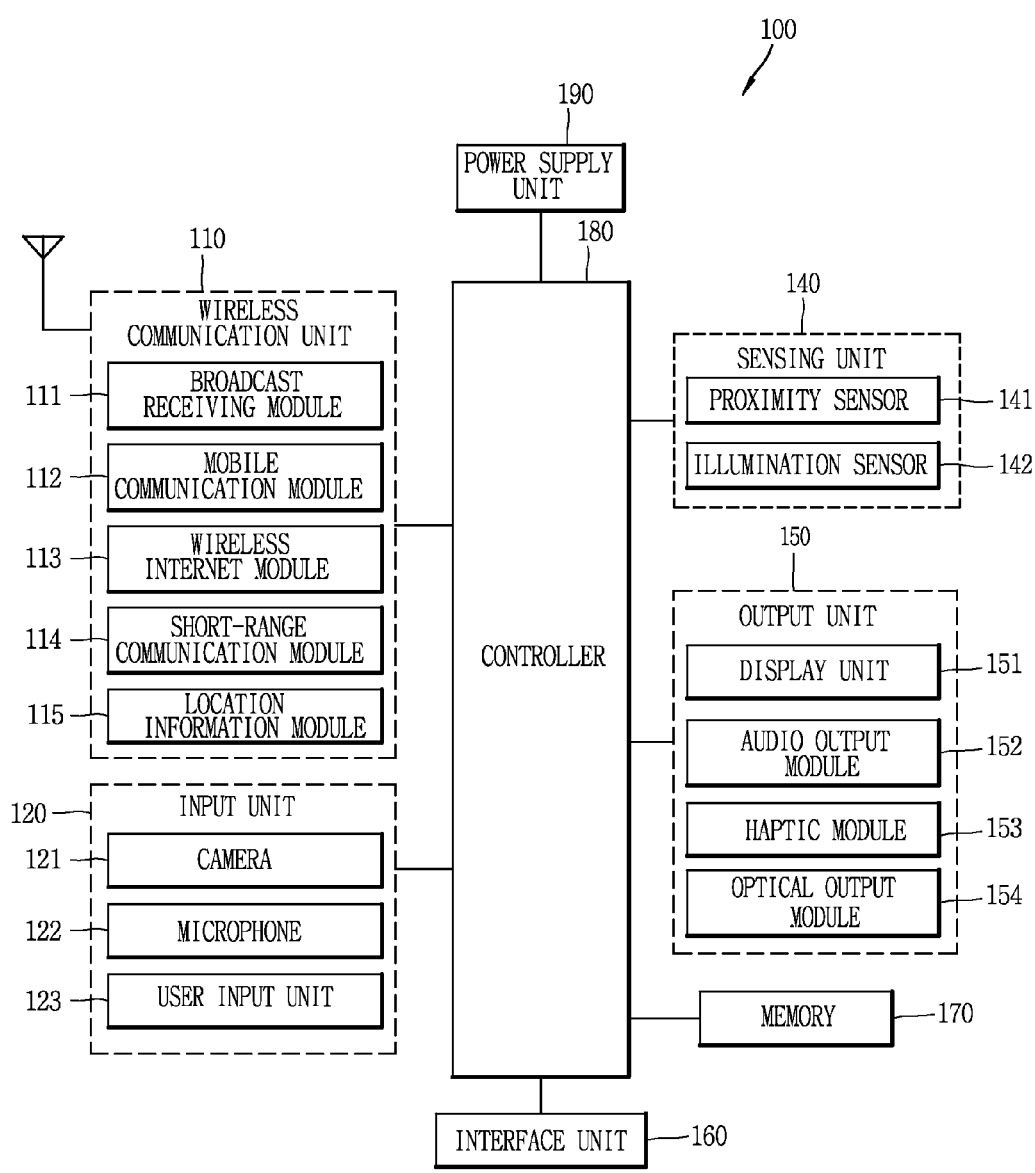
FIG. 1A is a block diagram of a mobile terminal according to an embodiment of the present disclosure.
Figure 1B:
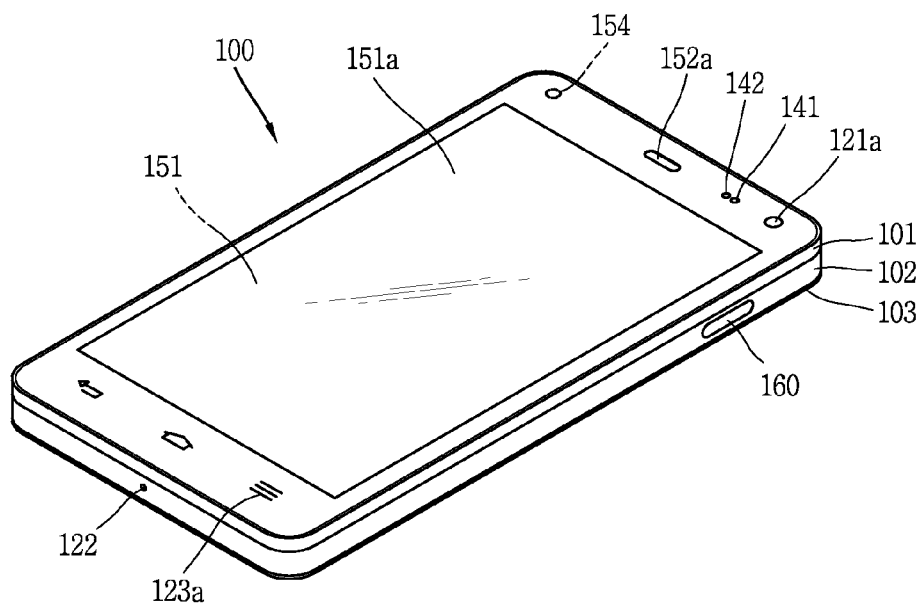
FIGS. 1B and 1C are conceptual views illustrating one example of the mobile terminal, viewed from different directions.
Figure 1C:
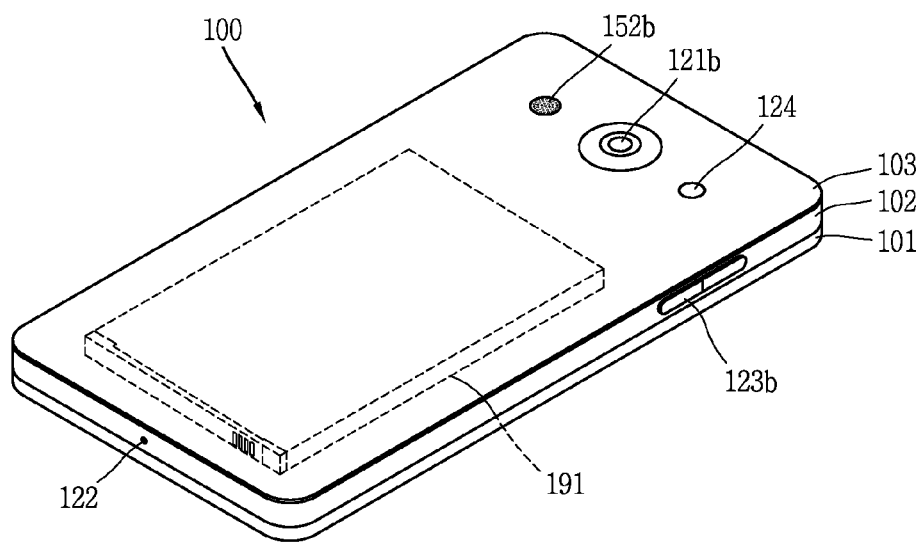

FIG. 1A is a block diagram of a mobile terminal in accordance with the present disclosure, and FIGS. 1B and 1C are conceptual views illustrating one example of the mobile terminal, viewed from different directions. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

In more detail, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

The wireless communication unit 110 includes one or more of a broadcast receiving module 111, a mobile communication module 112, a wireless Internet module 113, a short-range communication module 114, and a location information module 115. The input unit 120 includes a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) is obtained by the input unit 120 and may be analyzed and processed according to user commands.

The sensing unit 140 is typically implemented using one or more sensors configured to sense internal information of the mobile terminal, the surrounding environment of the mobile terminal, user information, and the like. For example, the sensing unit 140 can include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 is typically configured to output various types of information, such as audio, video, tactile output, and the like. The output unit 150 is shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 can control at least two of those components included in the mobile terminal to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100. First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Enhanced Voice-Date Optimized or Enhanced Voice-Data Only (EV-DO), Wideband CDMA (WCDMA), High Speed Downlink Packet access (HSDPA), High Speed Uplink Packet Access (HSUPA), Long Term Evolution (LTE), LTE-advanced (LTE-A) and the like). Examples of the wireless signals include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LET-A, and the like, as part of a mobile communication network, the wireless Internet module 113 may be understood as a type of the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and is not limited to a module for directly calculating or acquiring the position of the mobile terminal.

The input unit 120 may be configured to permit various types of inputs (information or signals) to the mobile terminal 100. Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function (or an application program) being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operation of the mobile terminal 100 or execute data processing, a function or an operation associated with an application program installed in the mobile terminal based on the sensing signal. The sensing unit 140 can be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched region, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

Meanwhile, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100. An optical output module 154 can output a signal for indicating an event generation using light of a light source. Examples of events generated in the mobile terminal 100 may include message reception, call signal reception, a missed call, an alarm, a schedule alarm, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected. As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101. In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components is not limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 outputs information processed in the mobile terminal 100. For example, the display unit 151 may display execution screen information of an application program executing at the mobile terminal 100 or user interface (UI) and graphic user interface (GUI) information in response to the execution screen information. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces. The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver for transferring call sounds to a user's ear and the second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule alarm, an email reception, information reception through an application, and the like. When a user has checked a generated event, the controller 180 can control the optical output module 154 to stop the light output.

The first camera 121a can process image frames such as still or moving images obtained by the image sensor in a capture mode or a video call mode. The processed image frames can then be displayed on the display unit 151 or stored in the memory 170. The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

When the rear input unit is provided on the rear surface of the terminal body, new types of user interfaces using the rear input unit can be implemented. Embodiments that include the aforementioned touch screen or the rear input unit may implement some or all of the functionality of the first manipulation unit 123a provided on the front surface of the terminal body. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123. The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject. The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2A:
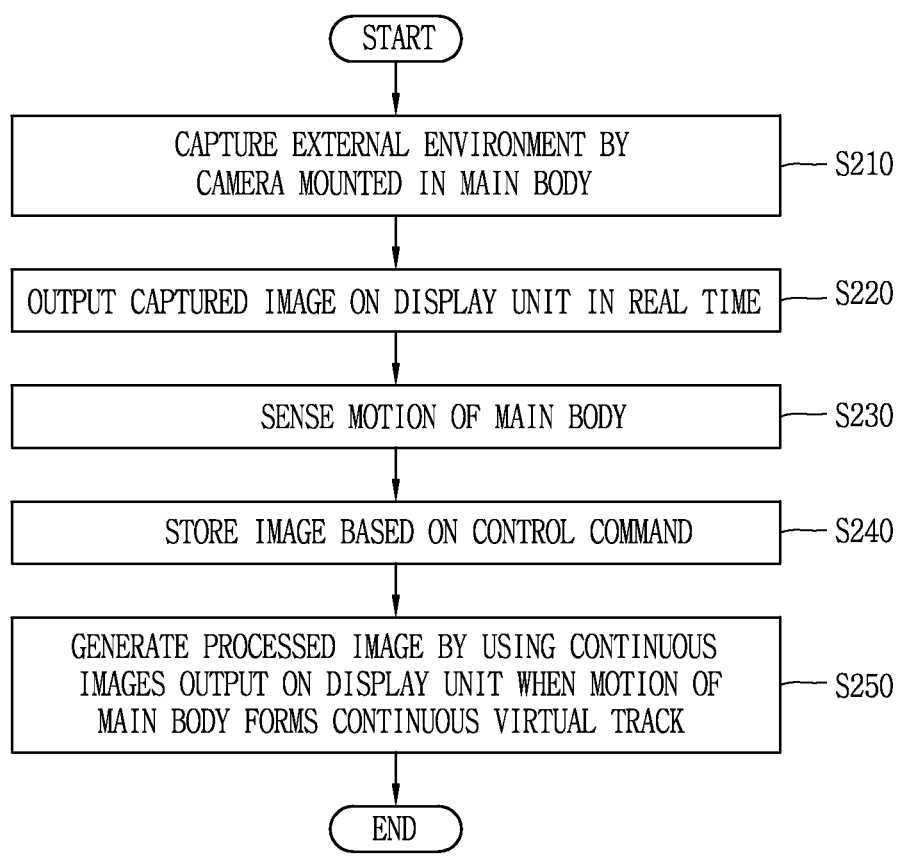
FIG. 2A is a flowchart illustrating a method of controlling a mobile terminal in accordance with one embodiment.
Figure 2B:
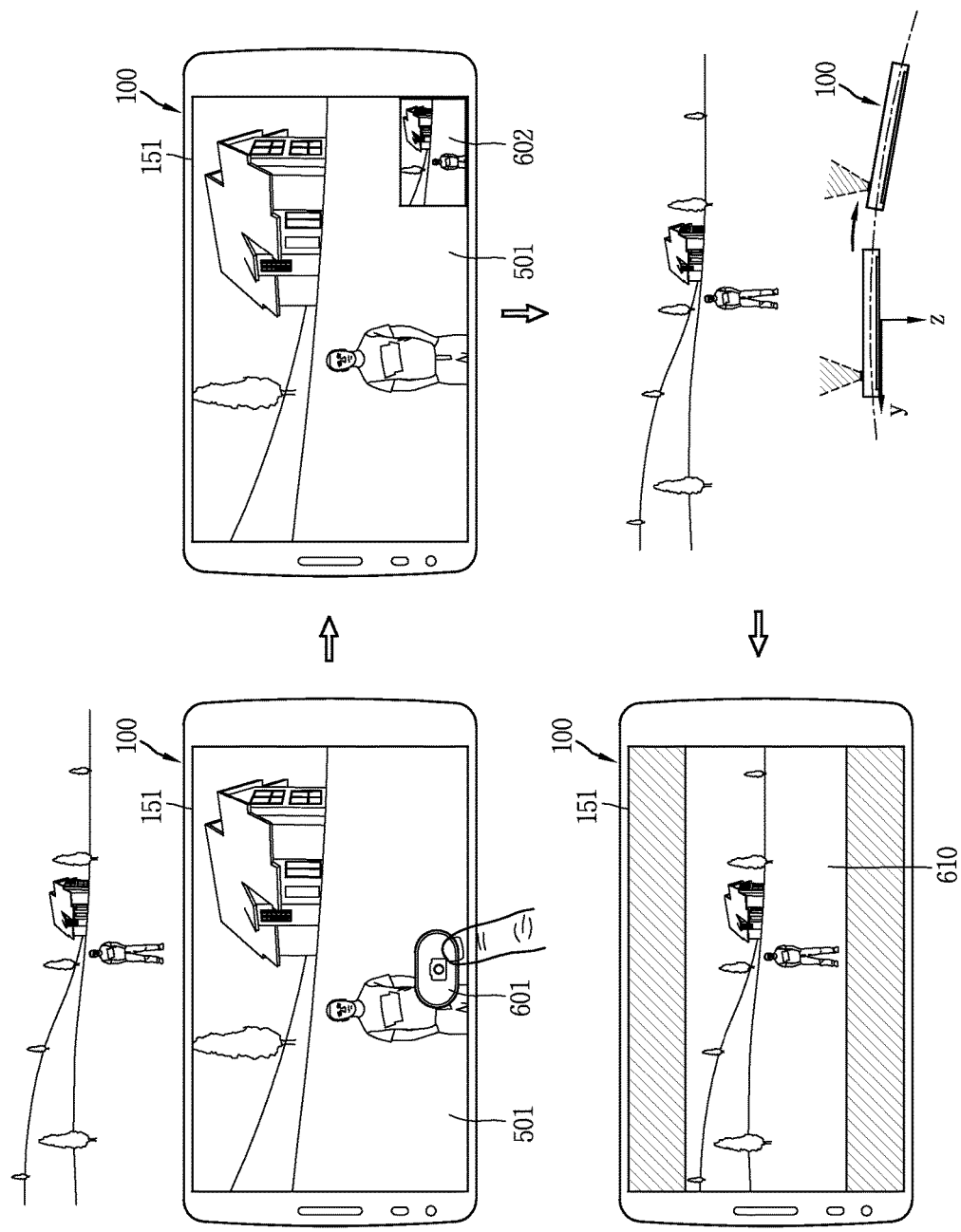
FIG. 2B is a conceptual view illustrating the control method of FIG. 2A.

FIG. 2A is a flowchart illustrating a method of controlling a mobile terminal in accordance with one embodiment, and FIG. 2B is a conceptual view illustrating the control method of FIG. 2A. As illustrated in FIGS. 2A and 2B, an external environment is captured by the camera 121 installed in the main body (S210). The camera 121 may correspond to the front camera 121a or the rear camera 121b of the mobile terminal 100. The captured image is then output on the display unit 151 in real time (S220). That is, the display unit 151 outputs a preview image 501 obtained by the camera 121, such that a user can view an image to be captured.

When a touch is applied to a capture icon 601, the controller 180 can capture a preview image 501 at the moment of the touch being applied and store the obtained preview image 501 in the memory 170. The controller 180 can then display a thumbnail icon 602 corresponding to the stored preview image 501 on the display unit 151. After storing the preview image 501, the controller 180 can continuously output a captured image on the display unit 151 or re-output a currently-obtained preview image by the camera 121.

Meanwhile, the sensing unit 140 senses a motion (or a movement) of the main body of the mobile terminal 100 while the captured image is displayed on the display unit 151 (S230). Further, the sensing unit 140 can sense the motion of the main body by including at least one of an acceleration sensor, a magnetic sensor, a G-sensor, and a gyroscope sensor. The controller 180 can also collect rotation (turning) information related to the camera 121 using the sensing unit 140.

Also, the sensing unit 140 can include an inertial measurement unit (IMU) for sensing an inclination (tilt) of the main body. The IMU senses rotations which are performed centering on axes which are perpendicular to one another in three directions. Among such rotations, a rotation centering on a y-axis may be defined as a roll motion, a rotation in a lateral direction (centering on an x-axis) may be defined as a pitch motion, and a rotation centering on a perpendicular axis (z-axis) may be defined as a yaw motion. Angular velocity values relating to rotations centering on the three axes may be measured.

During the output of the preview image, the display unit 151 can display a plurality of graphic images to which touch inputs are applied to control functions of the camera 121. For example, the display unit 151 may include a capture icon 601 to which a touch input is applied to store the preview image 501 in the memory 170. The controller 180 can store the preview image 501 in response to the touch input applied to the capture icon 601 (S240). The sequence of the steps S230 and S240 can be reversed.

In addition, the controller 180 generates a processed image by using continuous images output on the display unit 151 when the motion of the main body forms (or defines) a continuous virtual track (S250). When a moving path of the main body sensed by the sensing unit 140 forms a relatively regular curve or when the motion of the main body according to the lapse of time is constant, a virtual track based on the motion of the main body can be generated. The controller 180 can form the virtual track based on the motion of the main body for a specific period of time.

Alternatively, when a rotation of the main body centering on a specific axis is sensed by the IMU of the sensing unit 140, the controller 180 can form a virtual track based on the sensed rotation. When the motion of the main body sensed by the sensing unit 140 forms the virtual track, the controller 180 controls the memory 170 to store therein the image obtained by the camera 121 while the main body moves. For example, the controller 180 can store the images at a preset time interval while the main body moves, and the time interval may be decided by velocity that the main body moves or rotates. The controller 180 can also control the memory 170 to store images at a shorter time interval when the main body moves or rotates fast.

The controller 180 generates the processed image using a plurality of images stored while the main body moves and information relating to the virtual track. The controller 180 can generate the processed image by storing the plurality of continuous images along with motion information related to a relative movement of the main body, arranging the plurality of images based on the motion information, and deleting overlapping portions. However, the step of generating the processed image is not limited to this.

When the capturing of the images is completed, the controller 180 can output the processed image. A first processed image 610 illustrated in FIG. 2B corresponds to a panoramic image. When images are collected while the main body rotates centering on a specific axis, the panoramic image may include visual information related to an external environment within a range of the rotation centering on the specific axis. When the main body makes a turn centering on the axis, the panoramic image may include information related to a 360-degree external environment. In this instance, both sides (edges, ends) of the panoramic image may correspond to an image of substantially the same region.

According to an embodiment of the present invention, without a separate user control command for generating a continuous processed image, the user's intent can be recognized based on the motion of the main body of the mobile terminal and the processed image can be generated based on the motion information. Accordingly, since a capturing mode is changed and the processed image is generated based on the motion information, a separate change in the capturing mode is not needed and the processed image with improved quality can be provided. Therefore, the controller 180 can select a type of the processed image using the virtual track.

Figure 3A:
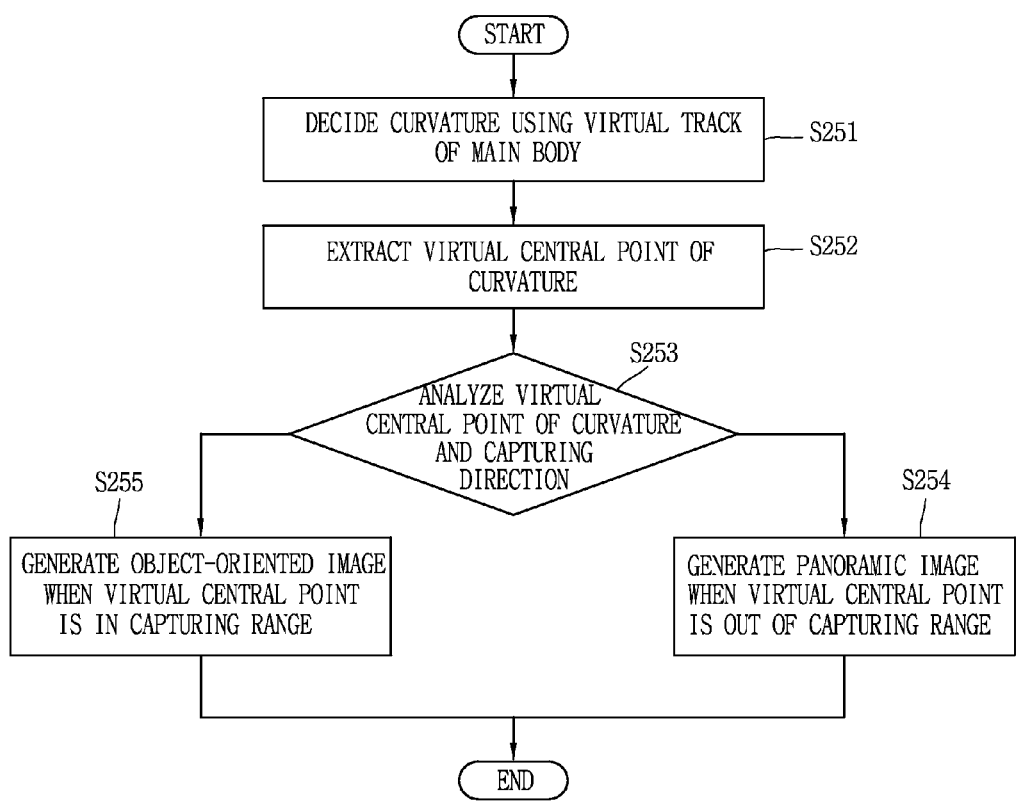
FIGS. 3A and 3B are conceptual views illustrating a control method for generating a processed image.
Figure 3B:
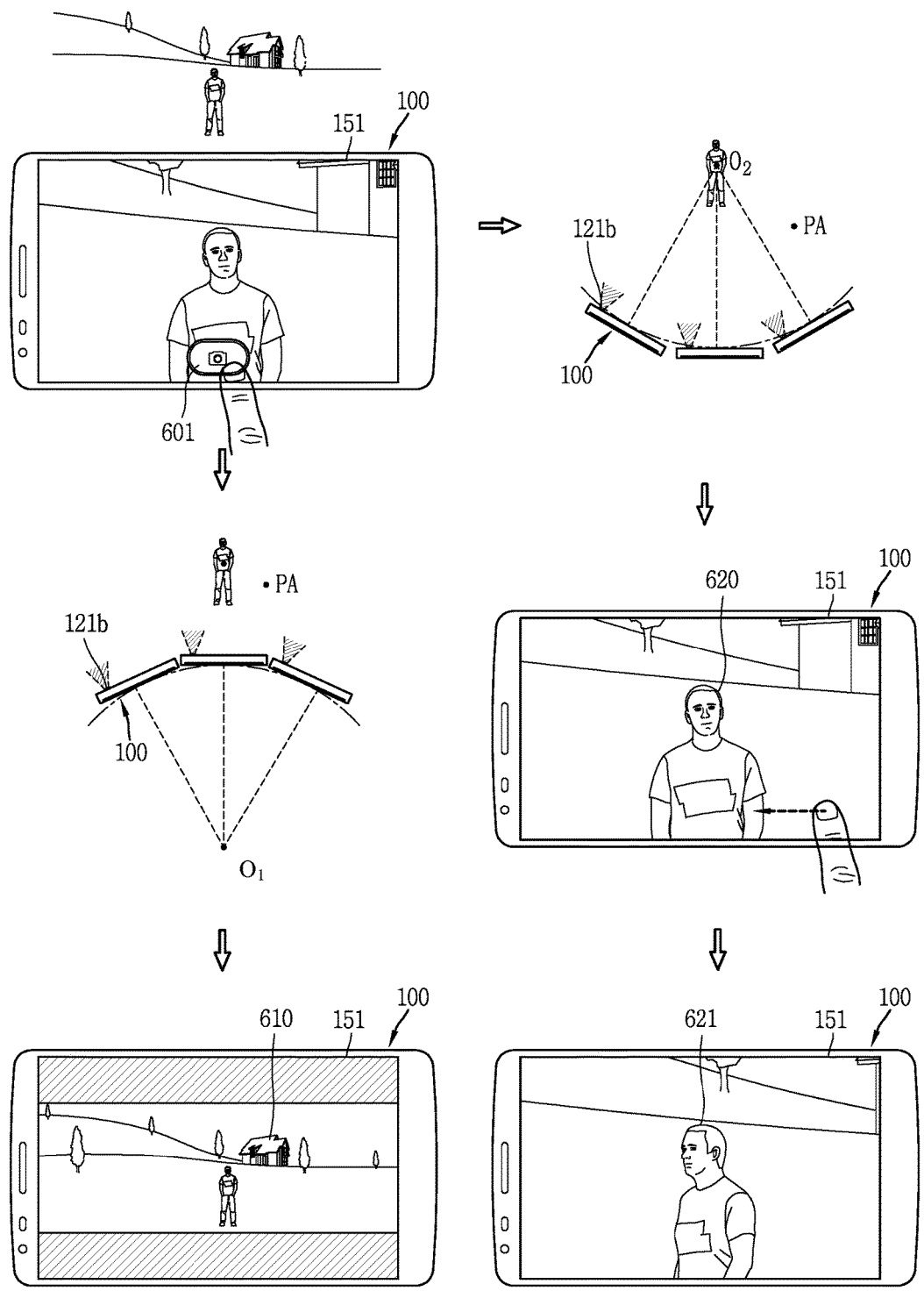

Next, FIGS. 3A and 3B are conceptual views illustrating a control method for generating (creating, forming) a processed image. The controller 180 decides a curvature using the virtual track of the main body (251). The controller 180 extracts a virtual central point using the curvature of the virtual track of the main body which continuously moves (S252). The mobile terminal according to this embodiment includes sensing the virtual track of the main body using the IMU.

When a rotation of the main body centering on a specific axis is sensed by the IMU, the controller 180 can set one point of the specific axis to a virtual central point. Or, when a movement of the rotation axis, which is the centering axis for the rotation of the main body, is sensed by the IMU, the controller 180 can extract the virtual central point using information related to the movement of the main body.

The controller 180 can set as the virtual central point, a point on which straight lines perpendicular to one surface of the main body with the camera installed therein meet together while the main body moves. The controller 180 can also sense the motion of the main body until an error range of the set virtual central point becomes smaller than a preset reference error range.

Further, the controller 180 analyzes the virtual central point and a capturing direction (S253), and selects a type of an image to generate by using a plurality of images collected, according to whether or not the virtual central point is included in a capturing region (or a capturing range) based on the capturing direction. FIG. 3B illustrates an embodiment in which an external environment is captured by the second camera 121b mounted on the rear surface of the mobile terminal.

In addition, the controller 180 generates a panoramic image when a first central point O1, which has been extracted based on the motion of the main body, is located at the outside of a capturing range PA of the second camera 121b (S254). In this instance, the first central point O1 is generated on a region facing the display unit 151. When the user performs capturing while viewing the display unit 151, since the first central point O1 is formed in the region where the user is located based on the main body, the virtual track forms a concave curve based on the user.

When a second central point O2, which has been extracted based on the motion of the main body, is formed within the capturing range PA of the second camera 121b, the object-oriented image is generated (S255). The object-oriented image is generated by a plurality of images which are obtained by capturing a selected object at various angles. The user can thus be provided with continuous images of the selected object through the object-oriented image. The second central point O2 is formed in a region where the selected object is present based on the main body.

Referring to FIG. 3B, the controller 180 outputs a second processed image 620 which corresponds to the object-oriented image on the display unit 151. The second processed image 620 may be one image which is captured at a specific angle. Here, the selected object may be displayed on the display unit 151 in a highlighting manner. The controller 180 can control the display unit 151 to output a transformed image 621 which is obtained by capturing the object in a different direction, in response to a touch input applied to the display unit 151 on which the second processed image 620 is output. The touch input may correspond to a dragging touch, and a capturing direction of the transformed image 621 may be decided according to a direction of the dragging touch.

When a flicking touch is applied, the display unit 151 can continuously output a plurality of transformed images captured in different directions. Or, the controller 180 can reproduce the object-oriented image in a manner that the plurality of transformed images are continuously output according to the lapse of time. Further, the controller 180 generates different processed images by arranging the plurality of images, which are captured during the movement of the main body, based on the first and second central points O1 and O2.

According to this embodiment, the user does not have to distinctively activate a capturing mode for generating an object-oriented image of a specific object by performing capturing based on the specific object during the continuous capturing, or a capturing mode for generating a panoramic image by capturing an external environment that extends over a capturing region. Also, since a processed image is generated based on information related to set first and second central points, a separate control command applied by the user or additional information for arranging a plurality of images does not have to be input.

Figure 4A:
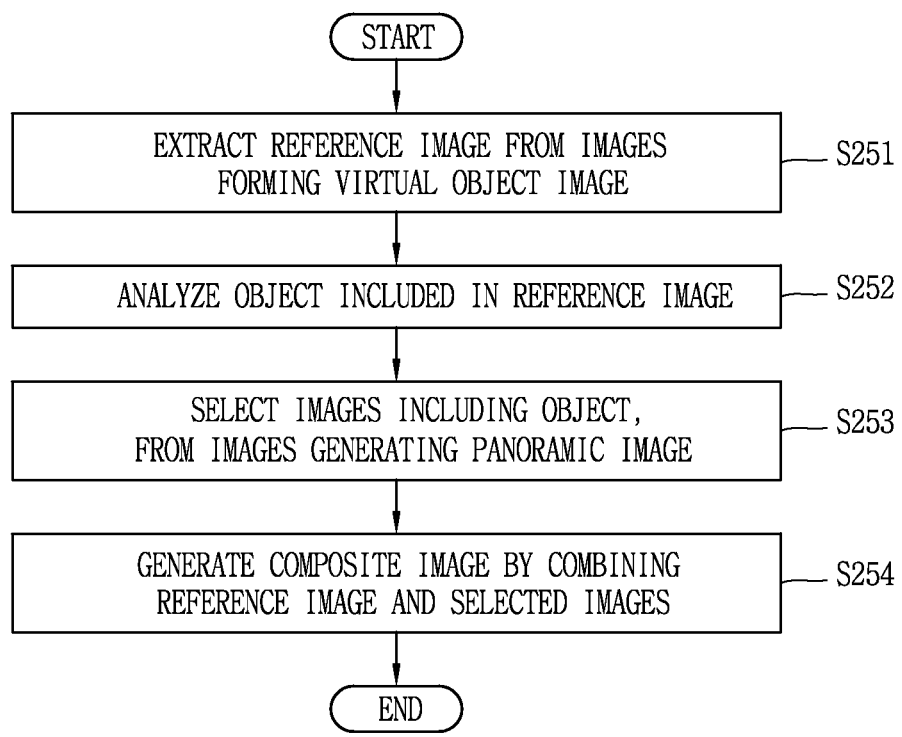
FIG. 4A is a flowchart illustrating a control method of combining (synthesizing) first and second processed images.
Figure 4B:
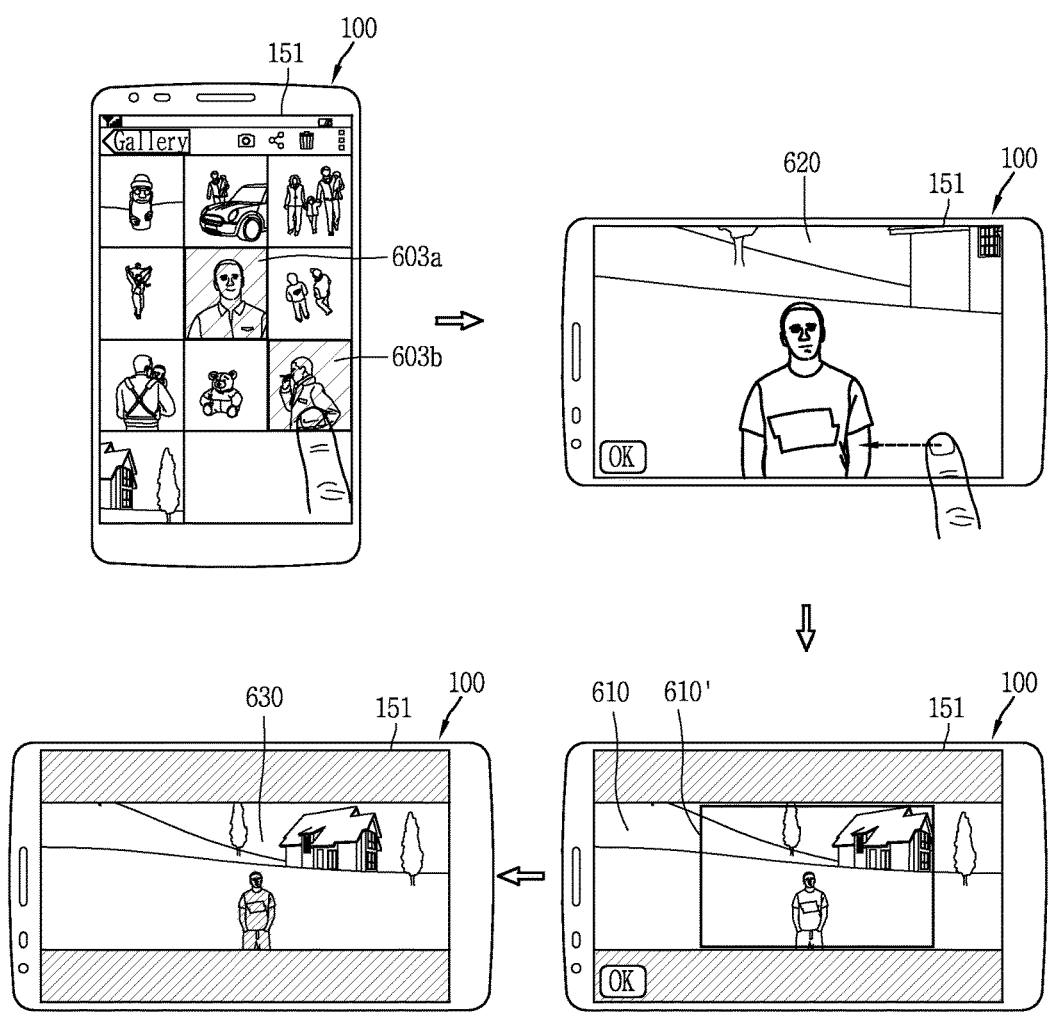
FIGS. 4B to 4E are conceptual views illustrating a control method of controlling a composite image.
Figure 4C:
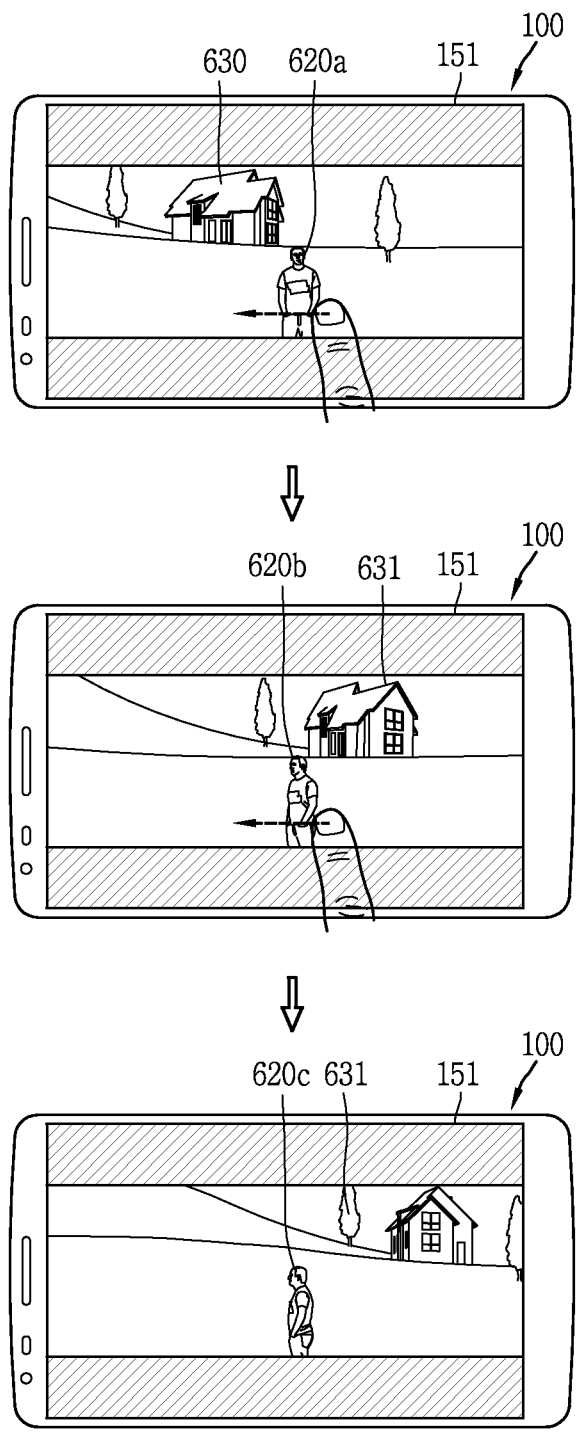

Next, FIG. 4A is a flowchart illustrating a control method of combining (synthesizing) first and second processed images, and FIG. 4B is a conceptual view illustrating the control method of FIG. 4A. As illustrated in FIG. 4B, the display unit 151 displays first and second thumbnail views 603a and 603b corresponding to the first and second processed images 610 and 620 on an execution screen of an application which provides stored images.

The controller 180 executes a combining (or synthesizing) function in response to a touch applied to the first and second thumbnail views 603a and 603b. Further, the controller 151 first outputs the second processed image 620 corresponding to the object-oriented image including the specific object, and extracts a reference image from the plurality of images, which form the object-oriented image 610 based on a user's touch input (S251). The display unit 151 then displays one of the plurality of images in response to a user's drag touch input, and decides the output image as the reference image in response to a touch applied to select the output image.

Alternatively, a preset reference image may be included in the plurality of images which form the object-oriented image. For example, the controller 180 can set as a reference image a first image which has been obtained at the moment when the capturing of the object-oriented image 610 is first performed, and store the set reference image. The first image can be displayed on a thumbnail view of the second processing image 610. Alternatively, a central image which is arranged at the center of the second processed image 610 may be set to the reference image.

The controller 180 analyzes an object included in the reference image (S252). For example, the controller 180 can analyze a capture angle at which the object has been captured, an arranged angle between the object and other objects included in the image, a relative distance, and the like. When the reference image is a person, the controller 180 can extract information related to the person based on information regarding a person pre-stored in the memory 170.

Further, the controller 180 selects images including the object, from images forming the first processed image 610 corresponding to the panoramic image (S253). The controller 180 also extracts (or selects) the images, which match the reference image, based on whether or not there are images including the object in the images of the first processed image 610, a capture angle of the captured object, a relative position and size of the object from other objects, and the like.

In addition, the display unit 151 can display an indicator 610' indicating the selected image while the first processed image 610 is displayed. The controller 180 can also move the indicator 610' on the first processed image 610 in response to a touch applied to the indicator 610'. In this instance, the controller 180 can select an image of a region included in the indicator 610' as an image to be combined. The image selected (i.e., the image to be combined) may correspond to a region at which a plurality of images captured at different time points are to be combined.

The controller 180 then generates a composite image 630 using the reference image and the selected images (S254), and outputs the composite image 630 on the display unit 151. The composite image 630 may include all of information related to the first and second processed images 610 and 620, and be implemented as a virtual image on a head-mounted display. Meanwhile, to generate the composite image, the controller 180 can select only a part of an image corresponding to the object from the images of the object-oriented image, and generate a composite image including only the part of the image.

This embodiment allows for combining virtual object images of a subject to be captured, included in a panoramic image, but the present invention is not limited to this. For example, the controller 180 can combine the panoramic image and the object-oriented image which have been captured at different regions. In this instance, an image associated with the object selected from the object-oriented image may be extracted to be combined with the panoramic image. Here, the user may arbitrarily select a region for outputting the object image thereon from the panoramic image.

According to this embodiment, the user can combine the first and second processed images, which have been captured while moving along different virtual tracks, based on the selected object. Hereinafter, a method of outputting the composite image will be described in detail.

Figure 4D:
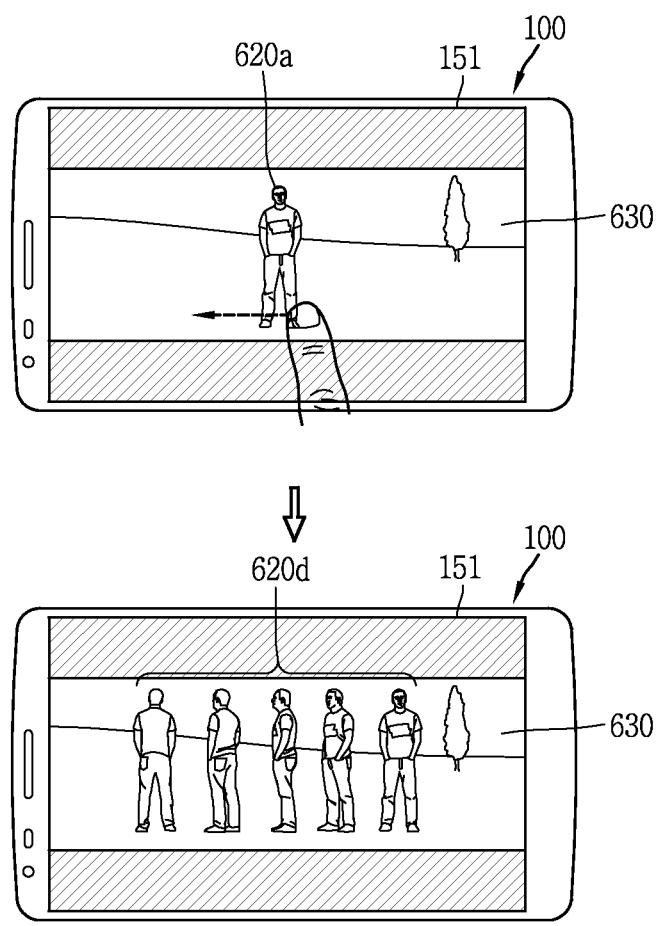
Figure 4E:
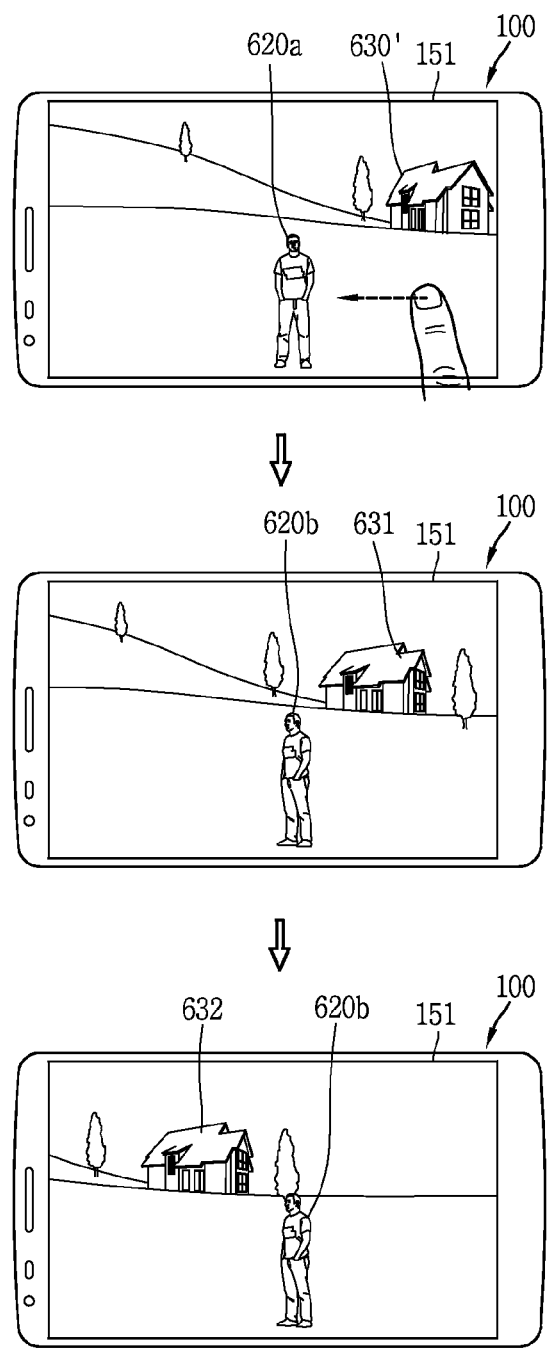

FIGS. 4B and 4E are conceptual views illustrating a control method of controlling a composite image. Referring to FIG. 4B, a transformed image of the second processed image is displayed, in response to a touch applied to the display unit 151 on which the composite image 630 is displayed. The composite image 630 includes an object image 620a output on one of images forming the panoramic image.

The controller 180 controls the display unit 151 to output a first transformed object image 620b and a transformed panoramic image 620b of the object, which have been captured in different regions, based on a preset touch applied to the object image 620a. The first transformed object image 620b is generated by a first transformed image, which corresponds to one of a plurality of images forming the object-oriented image.

For example, the transformed image and the panoramic image may correspond to images captured when the capturing direction of the camera is parallel to a straight line connecting the first and second central points O1 and O2. The transformed panoramic image 631 includes the composite image 630 and the first transformed object image 620b, and is generated by a synthesis of the composite image 630 and the first transformed image 620b which corresponds to the object-oriented image.

Meanwhile, when an additional touch is applied to the first transformed object image 620b, the controller 180 extracts a second transformed image which forms the object-oriented image. The display unit 151 displays the second transformed object image 620c based on the second transformed image.

In this instance, the display unit 151 displays the transformed panoramic image 631 as it is but the present invention is not limited to this. For example, when an image which matches the second transformed image is extracted from the panoramic image, the controller 180 can combine the second transformed image with the extracted image, so as to generate another composite image.

According to this embodiment, images which have been captured in different manners in substantially the same space may be combined and images captured in different directions can be provided by applying a touch to those combined images.

Referring to FIG. 4D, when a preset touch is applied to the object image 620a while the composite image 530 is output, the controller 180 controls the display unit 151 to display a multiangular image 620d. Here, the preset touch may correspond to a long touch applied to the object image 620a.

The multiangular image 620d is included in the object-oriented image, and includes a plurality of images captured in different directions. The display unit 151 arranges the plurality of images in one direction to correspond to sequential capturing angles. Further, the controller 180 generates the multiangular image 620d by extracting only regions with the selected object captured therein from the plurality of images forming the object-oriented image.

Referring to FIG. 4E, the display unit 151 displays a first region 630' of the composite image 630, and also output the object image 620a on the first region 630'. The controller 180 outputs a second region 631, which is continuously captured with the first region 630', in response to a touch applied to the display unit 151. The second region 631 may include a part of the first region 630'. The controller 180 displays the first transformed image 620b along with the first region 630'.

When a touch is applied to the second region 631 while the first transformed image 620b is displayed, the controller 180 converts the second region 631 into a third region 632. The first transformed image 620b may be displayed on the third region 632, but the present invention is not limited to this. When there is an image of the object captured in a different direction according to the touch direction, the controller 180 can change the first transformed image 620d into a third transformed image (not illustrated).

According to this embodiment, one region of a composite image can sequentially be provided based on a touch applied to the composite image, and an image of a captured object in another region can interoperably be provided.

Next, FIGS. 5A to 5D are conceptual views illustrating a control method of generating a processed image in accordance with another embodiment. When the sensing unit senses a touch applied to the capture icon 601 while the preview image 501 is output, the preview image 501 may be stored by the camera. The controller 180 senses a motion of the main body after the touch is applied to the capture icon 601.

When the motion of the main body defines (forms) a virtual track, the controller 180 stores a plurality of images obtained by the camera 121 together with information relating to the virtual track. That is, when the motion of the main body defines the virtual track, the controller 180 activates a continuous capturing mode for generating the panoramic image or a virtual object image.

In addition, the controller 180 outputs an indicator 701 indicating the continuous capturing mode on the display unit 151. An output position of the indicator 701 is not limited to the illustrated position. The controller 180 then decides a central point based on the virtual track, and controls the display unit 151 to output a guide image based on the location of the central point and a capturing region. As aforementioned in FIG. 3B, when the central point is not included in the capturing region, the controller 180 displays a first guide line 710 to guide the capturing of images for generating the panoramic image. In particular, the first guide line 710 may be formed to be horizontal with an edge of the display unit 151 so as to instruct a moving direction of the main body or minimize motion of the main body in an up-and-down direction.

In addition, the guide line to guide the capturing may be displayed even when generating the object-oriented image based on the virtual track. For example, while performing a function of generating the object-oriented image using images captured based on the motion of the main body, the controller 180 can display a guide line for guiding the motion of the main body based on a specific object on the display unit.

According to this embodiment, the user can recognize that the continuous capturing mode has been activated based on the indicator, without a separate control command. Also, when desiring to capture a panoramic image, the user can generate a more precisely formed processed image, by moving the main body along the guide line.

Figure 5A:
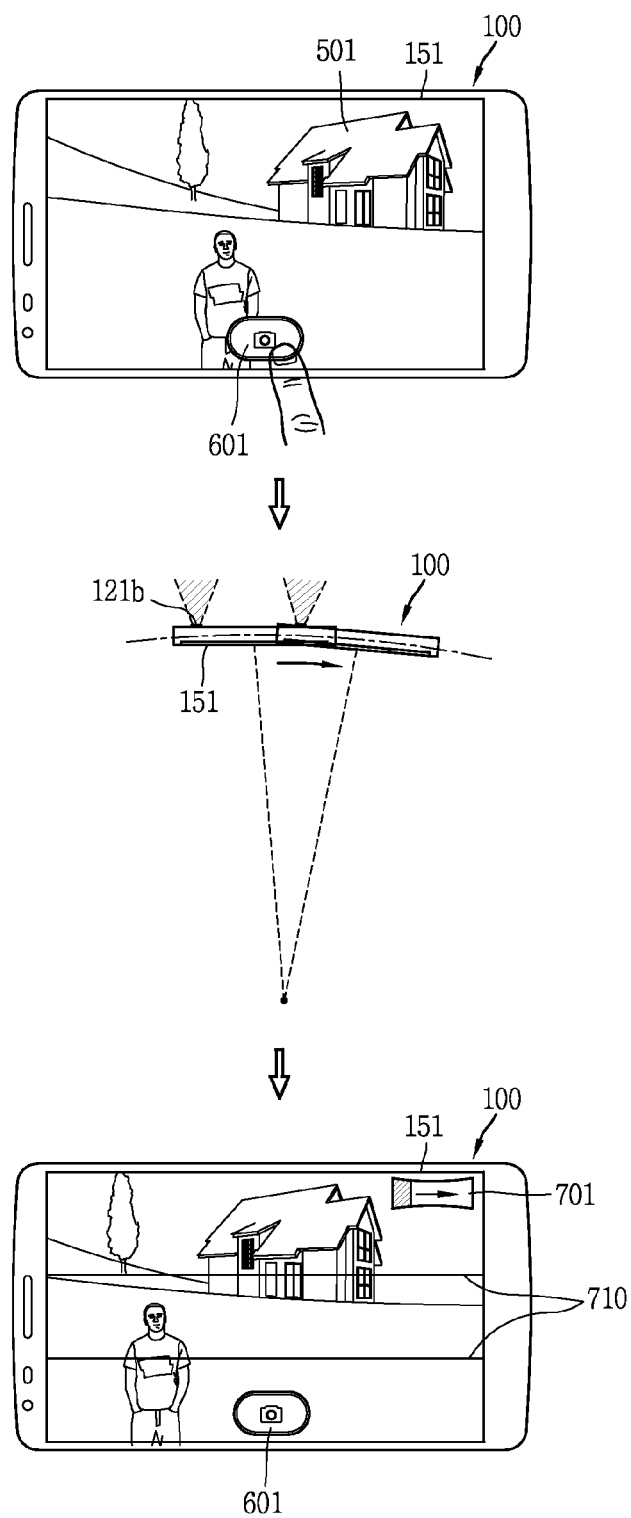
FIGS. 5A to 5D are conceptual views illustrating a control method of generating a processed image in accordance with another embodiment.
Figure 5B:
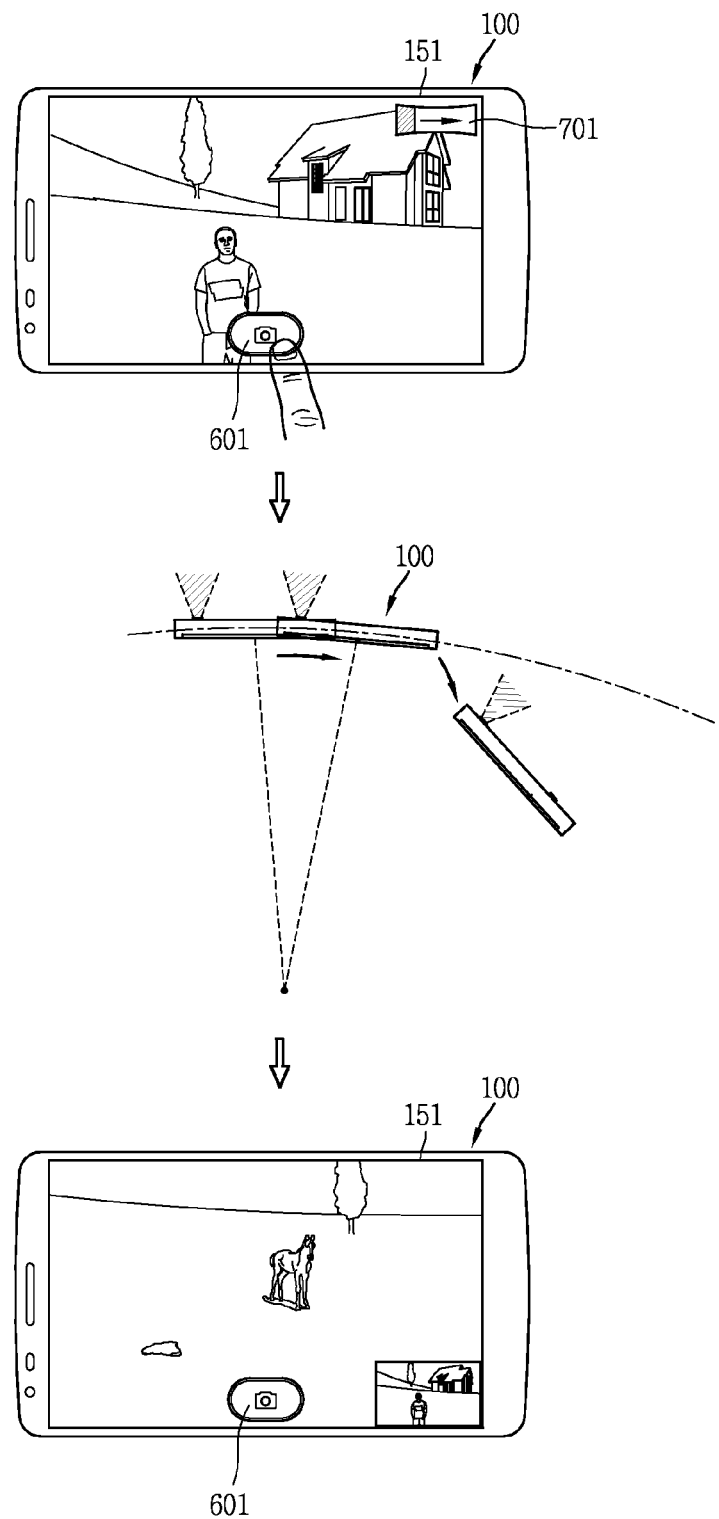

Hereinafter, a control method of releasing the continuous capturing mode will be described with reference to FIG. 5B. While the continuous capturing mode is activated, the display unit 151 displays the indicator 701 and the first guide line 710. The controller 180 maintains the continuous capturing mode when the motion of the main body forms a virtual track. However, when the motion of the main body moves out of the virtual track, the controller 180 can turn the continuous capturing mode into a deactivated state.

For example, the motion of the main body moving out of the virtual track corresponds to when the main body suddenly moves in another direction, when an altitude of the main body drastically changes or when the main body rotates centering on a specific axis. When the motion moving out of the virtual track is sensed, the controller 180 releases the continuous capturing mode and controls the display unit 151 not to display the indicator 701 and the first guide line 710 any more.

According to this embodiment, when the user's intent not to generate a panoramic image or a virtual object image is predicted by sensing the motion of the main body, the continuous capturing mode is released and thus an image obtained by the camera 121 is not stored any more. Therefore, the user's intent can correctly be interpreted and thus an image that the user does not want to store cannot be stored.

Figure 5C:
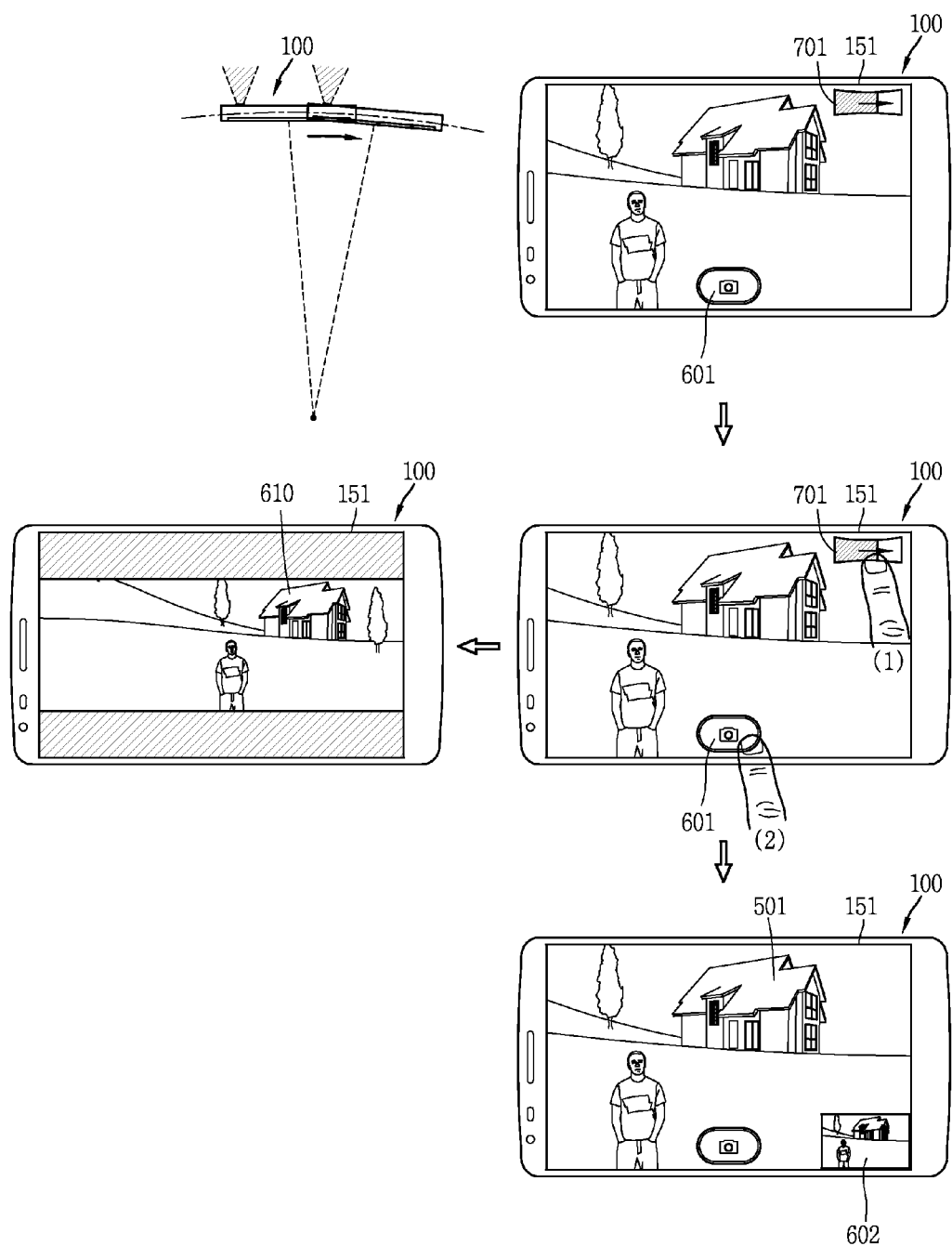

Referring to FIG. 5C, the controller 180 activates the continuous capturing mode based on the motion of the main body, and displays the indicator 701 on the display unit 151. The indicator 701 is output together with the capture icon 601. Further, the controller 180 controls the display unit 151 to display the first processed image 610 in response to a first touch applied to the indicator 701, controls the camera 121 to terminate the capturing based on the first touch, and generates the first processed image by using a plurality of images captured from a time point when the virtual track is formed by the motion of the main body up to a time point when the first touch is applied.

Meanwhile, the controller 180 stores a current preview image 501 in the memory 170, in response to a second touch applied to the capture icon 601. A thumbnail icon 602 corresponding to the pre-stored preview image 501 (i.e., the thumbnail icon 602 outputs the pre-stored preview image 501 thereon) is also displayed on the display unit 151. The controller 180 can terminate the continuous capturing mode based on the second touch, and delete every image obtained during the motion of the main body. Alternatively, when the motion of the main body does not escape from the virtual track, the controller 180 can store the plurality of images and generate the first processed image 610 using the plurality of images.

According to this embodiment, the user can automatically deactivate the activated continuous capturing mode or capture a single image, by applying a touch to the display unit 151. Accordingly, even when the continuous capturing mode is automatically activated, the user can control the camera to perform another function.

Figure 5D:
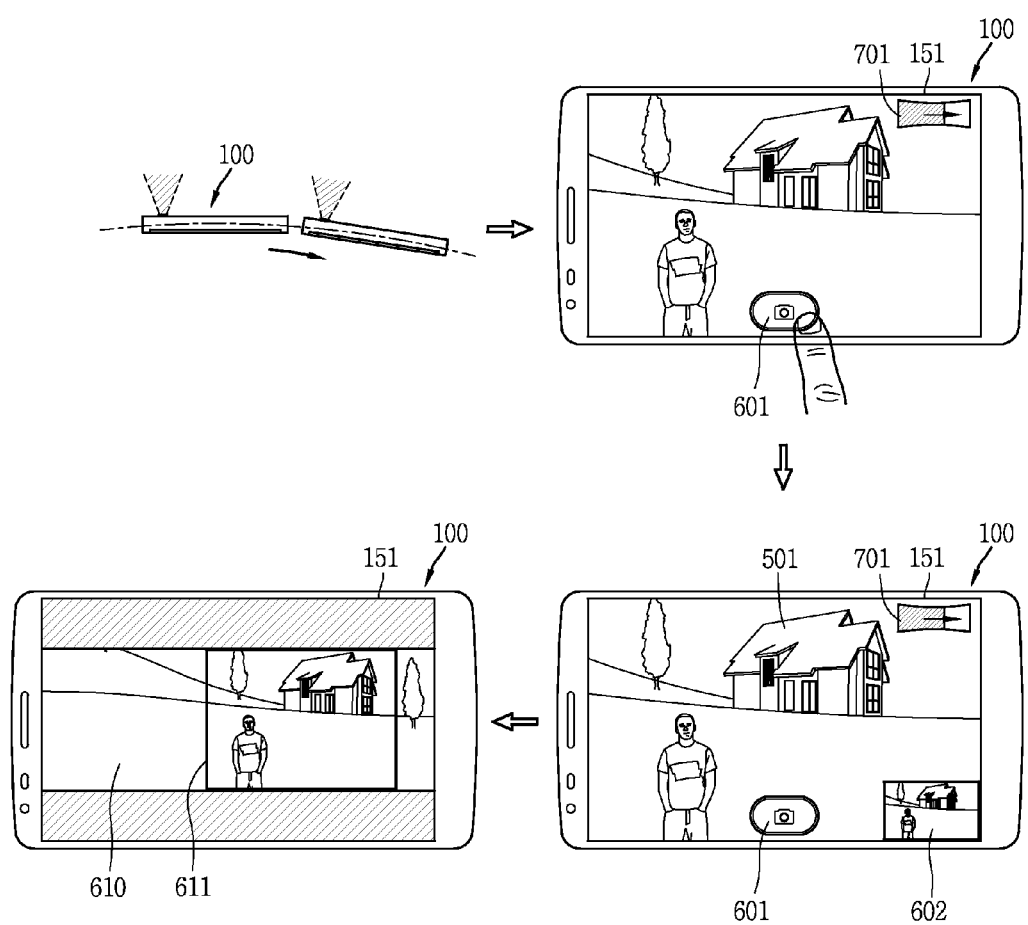

Referring to FIG. 5D, the controller 180 stores the preview image 501 at a preset time interval while the main body moves with forming the virtual track. Further, the controller 180 controls the memory 170 to store the preview image 501 which is output at the moment that a touch is applied to the capture icon 601 while the main body moves. The thumbnail icon 602 corresponding to the stored preview image 501 is also displayed on the display unit 151.

When it is sensed that the motion of the main body does not escape from the virtual track even though the touch is applied to the capture icon 601, the controller 180 continuously stores the continuous images. Further, the controller 180 outputs the first processed image 610 which is generated using a plurality of images captured by a preset control command. Also, the display unit 151 outputs a display portion 611, which indicates an image separately stored by the capture icon 601, on the first virtual image 610. In more detail, the controller 180 can display on the display unit 151 only an image captured in response to a touch applied to the display portion 611.

According to this embodiment, the controller 180 can store a separate image in response to a touch applied to the capture icon while the processed image is captured, and output the separate image on the virtual image so as to provide information related to the separately-stored image to the user.

Figure 6A:
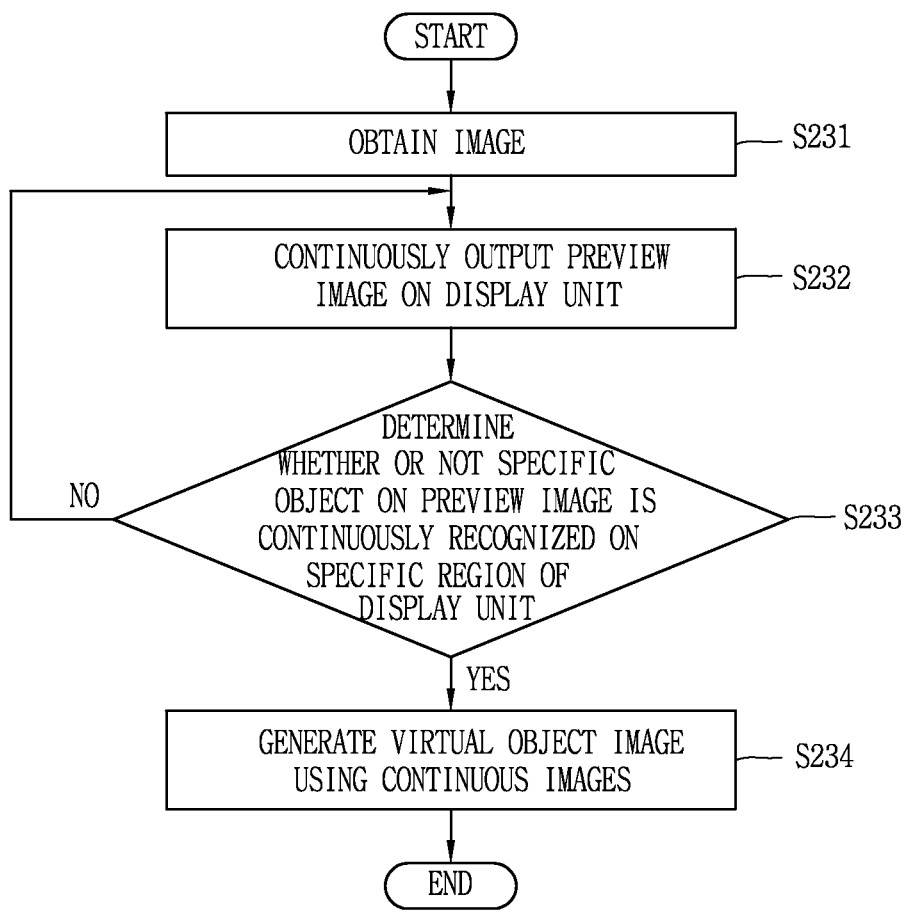
FIG. 6A is a flowchart illustrating a control method of generating an object-oriented image according to another embodiment.
Figure 6B:
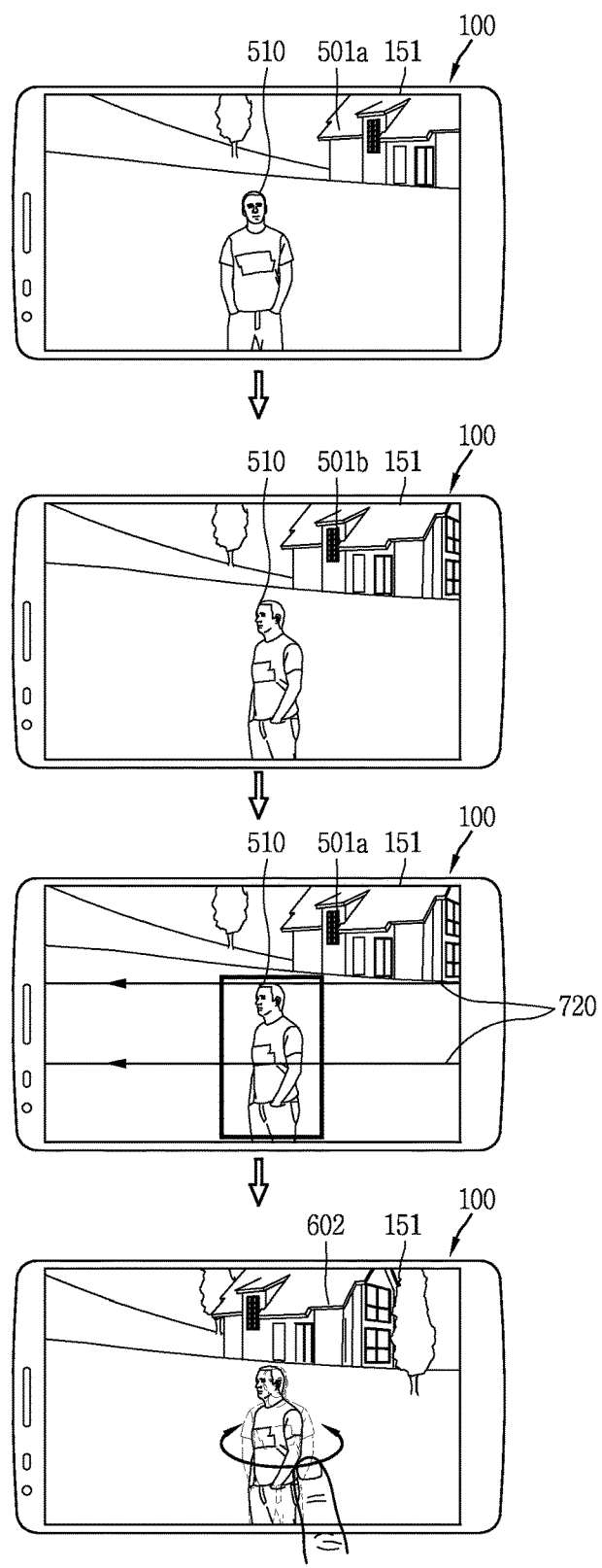
FIGS. 6B to 6D are conceptual views illustrating the control method of FIG. 6A.
Figure 6C:
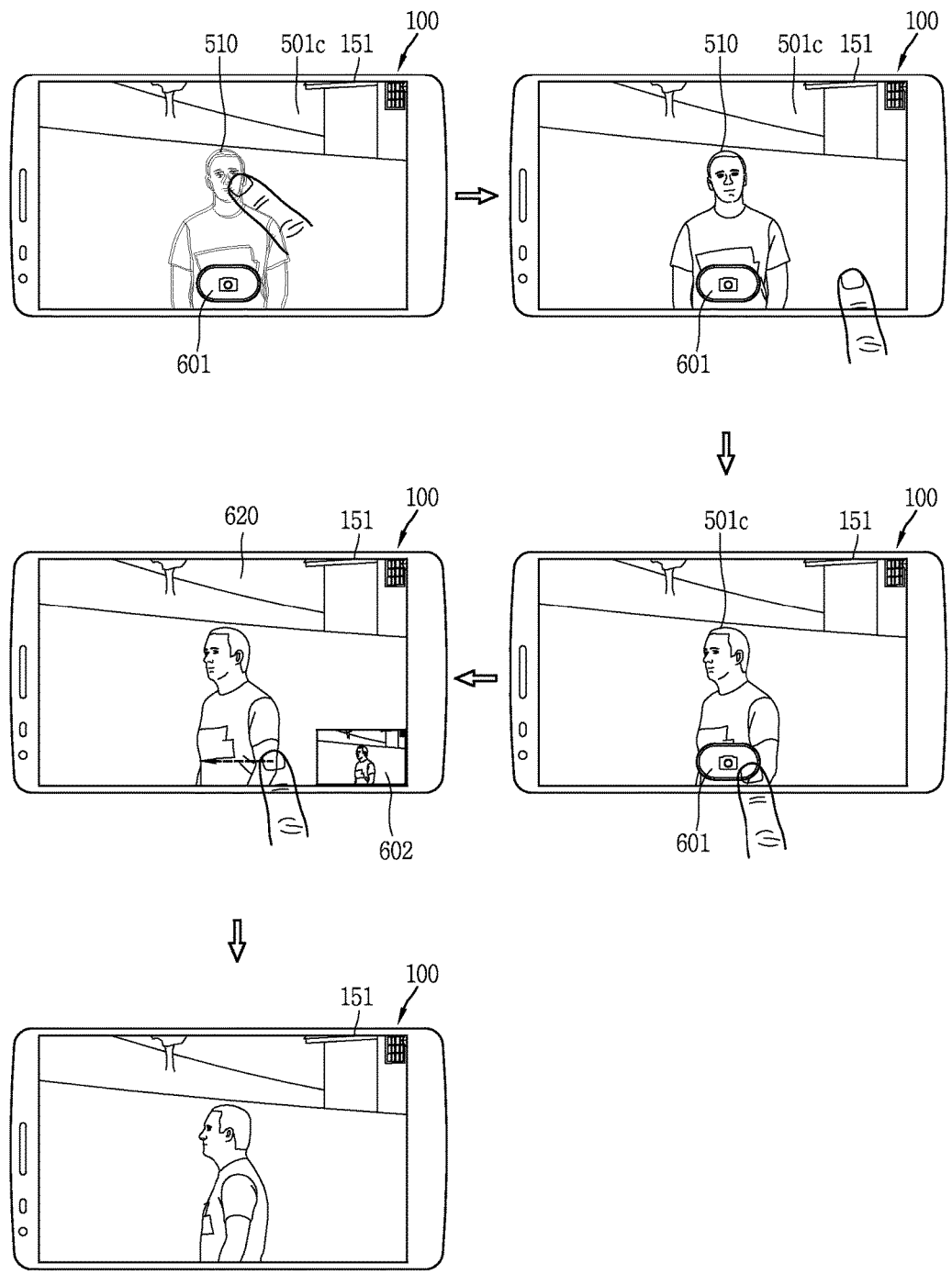
Figure 6D:
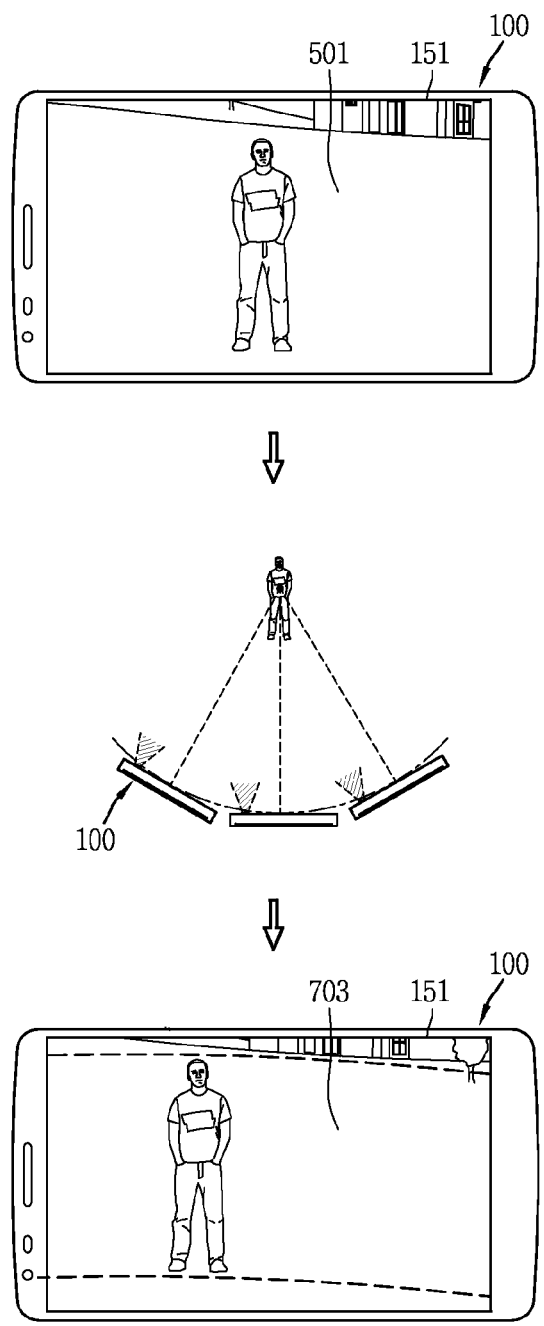

Next, FIG. 6A is a flowchart illustrating a control method of generating an object-oriented image according to another embodiment, and FIGS. 6B to 6D are conceptual views illustrating the control method of FIG. 6A. As illustrated in FIGS. 6A and 6B, while the camera 121 is activated and captures images, the display unit 151 displays the preview images in a continuous manner. In addition, the display unit 151 converts a first preview image 501*a* into a second preview image 501*b* based on the motion of the main body. The preview images which are output based on the motion of the main body may be continuous, and may not be formed only by two discontinuous images.

The controller 180 determines whether or not a specific object included in the preview image is continuously recognized at a predetermined region of the display unit 151 (S233). For example, the controller 180 determines whether or not an object 510 which is displayed at a specific region of the first preview image 501*a* is also displayed at a specific region of the second preview image 501*b*. For example, the specific region can be set to a central portion of the display unit 151, but the present invention is not limited to this. That is, the object 510, which has been displayed on the specific region of the display unit 151 while the first preview image 510*a* is displayed, can continuously be displayed while the second preview image 501*b* is displayed. A shape of the object 510 may vary based on a change in a capturing angle according to the motion of the main body.

The display unit 151 outputs a display portion 702 on the object 510 selected by the plurality of preview images. By virtue of the display portion 702, the controller 180 can check the object 510 and capture a plurality of images including the object 510 by moving the main body based on the object 510 when desiring to generate an object-oriented image. When the plurality of images are obtained by capturing the object, the controller 180 controls the display unit 151 to display a second processed image 620 including the selected object 510.

FIG. 6C illustrates a control method of generating an object-oriented image according to another embodiment. In particular, the display unit 151 displays a preview image 501*c* obtained by the camera 121. Further, the controller 180 controls the object 510 to be focused on in response to a touch applied to the preview image 501c. The controller 180 also controls the camera 121 to focus on the object 510 based on the touch, and select the object 510 on the preview image 501c to which the touch has been applied. The controller 180 can thus control the camera 121 to continuously focus on the objet even if the motion of the main body is sensed.

When the motion of the main body forms a virtual track after the object is selected, the controller 180 generates an object-oriented image using continuously-captured images. While the main body moves with forming the virtual track, the controller 180 can store a preview image 501c at the time point, in response to a touch applied to the capture icon 601. A thumbnail icon 602 corresponding to the stored preview image 501c is also displayed on the display unit 151.

In addition, the controller 180 generates a second processed image 620 formed by a plurality of images including the object, in response to a specific control command (e.g., a touch applied to the capture icon 601 or a fast movement of the main body). Images captured at different angles are thus sequentially output in response to a touch applied to the second processed image 620.

According to this embodiment, an object to which a touch is applied can be selected when a control command for focusing on the object is applied to a preview image. That is, the user can select an object, which the user desires to more sharply capture by focusing on it during capturing, as a subject of the object-oriented image.

Referring to FIG. 6D, when a central point formed by the virtual track is located in a capturing range (or a capturing region) of the camera 121, the controller 180 controls the display unit 151 to display a second guide line 703. The display unit 151 may form the second guide line 703 by sensing the motion of the main body. This allows the user to generate a more accurate object-oriented image.

Figure 7A:
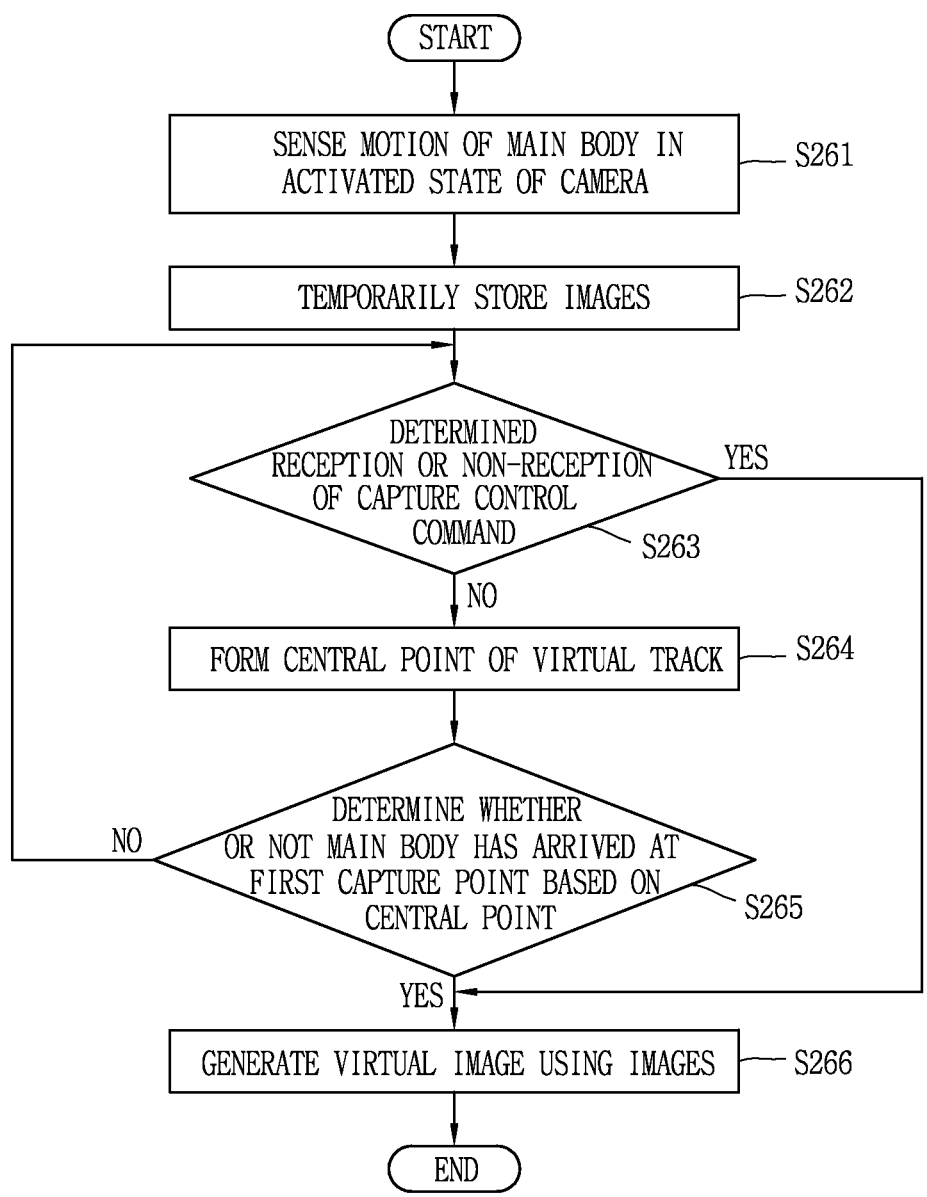
FIG. 7A is a flowchart illustrating a control method of generating a processed image in accordance with another embodiment.
Figure 7B:
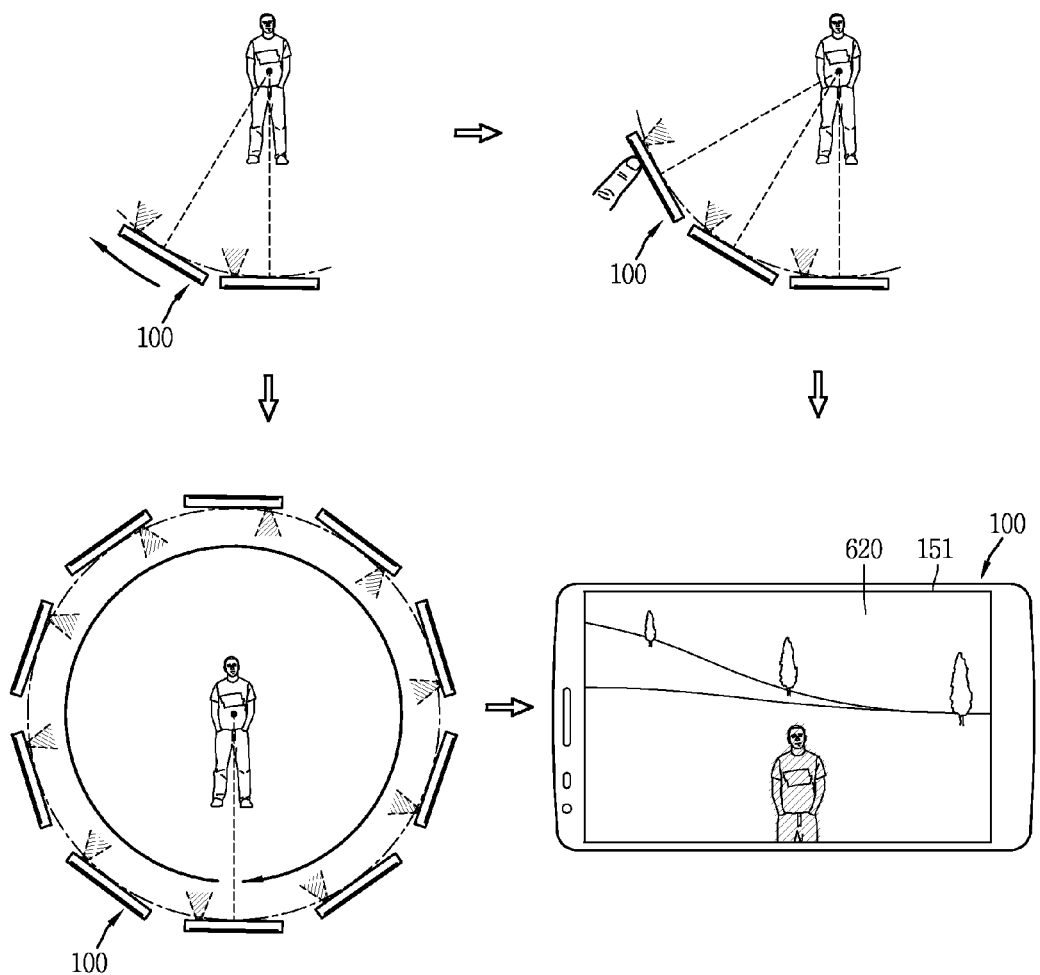
FIGS. 7B and 7C are conceptual views illustrating the control method of FIG. 7A.
Figure 7C:
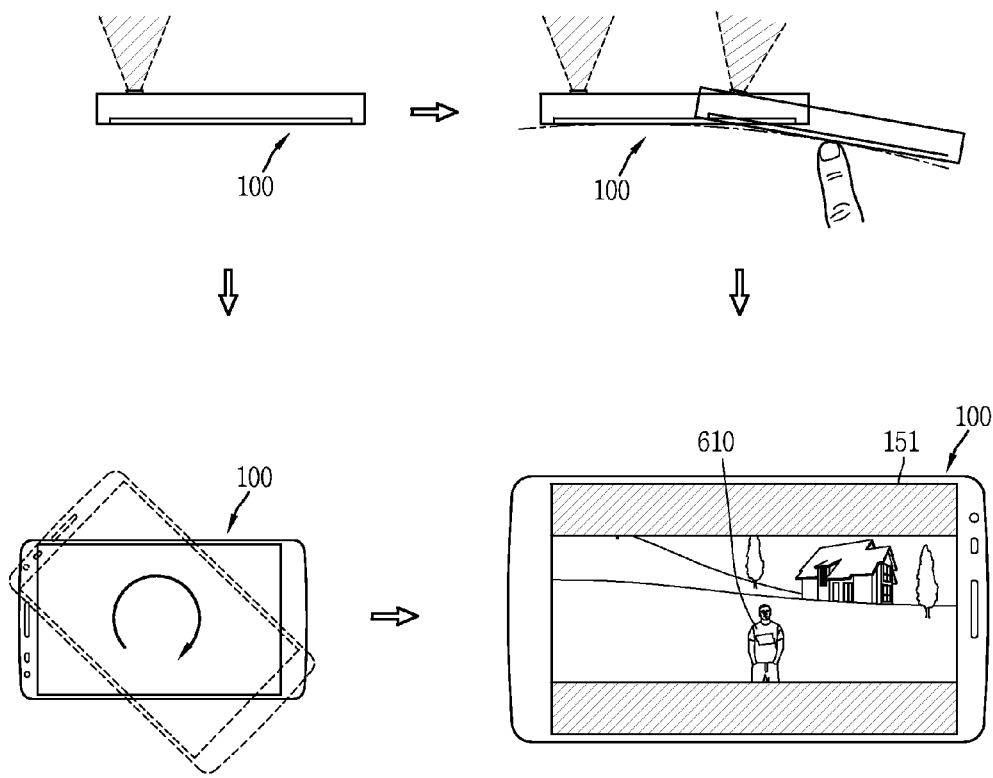

Next, FIG. 7A is a flowchart illustrating a control method of generating a processed image in accordance with another embodiment, and FIGS. 7B and 7C are conceptual views illustrating the control method of FIG. 7A. In an active state of the camera 121, the sensing unit senses a motion of a main body of a mobile terminal (S261). The controller 180 then temporarily stores a plurality of images sensed by the camera 121 while the main body moves (S262).

For example, while the camera is activated, and when it is sensed that the main body moves while forming a virtual track, the controller 180 can control the memory 170 to store those images. The controller 180 determines reception or non-reception of a capture control command (S263), and generates a processed image using the temporarily-stored images based on the capture control command when is the capture control command is determined as being received (S266). As illustrated in FIGS. 7B and 7C, the capture control command can be provided by a touch applied onto the display unit 151.

Meanwhile, while the capture control command is not received, the controller 180 forms a central point of the virtual track formed by the motion of the main body (S264). Further, the controller 180 determines whether or not the main body has arrived at a first capture point based on the central point (S265). Here, the first capture point corresponds to a position of the main body at the time when the controller 180 has first stored the images by sensing the motion of the main body. The controller 180 can store information related to the position of the main body sensed by the sensing unit.

When it is sensed the main body has made a turn along the virtual track based on the central point, the controller 180 can generate the processed image. The controller 180 outputs notification information when the main body arrives at the first capture point. The notification information may be vibration, sound data, visual information and the like.

Referring to FIG. 7B, when one of images collected by the motion of the main body is substantially the same as a first image, the controller 180 can terminate the capturing by the camera, and generate the processed image. Referring to FIG. 7C, when it is sensed that the main body has made a turn centering on a preset rotation axis, the controller 180 controls the camera 121 to stop the capturing.

According to this embodiment, the controller 180 can automatically terminate the capturing by recognizing a case of collecting images for generating one processed image, even when a control command for terminating the capturing is not separately applied by the user. Also, even when the processed image is generated, the controller 180 can control the display unit 151 to display the preview images in a continuous manner.

Figure 8A:
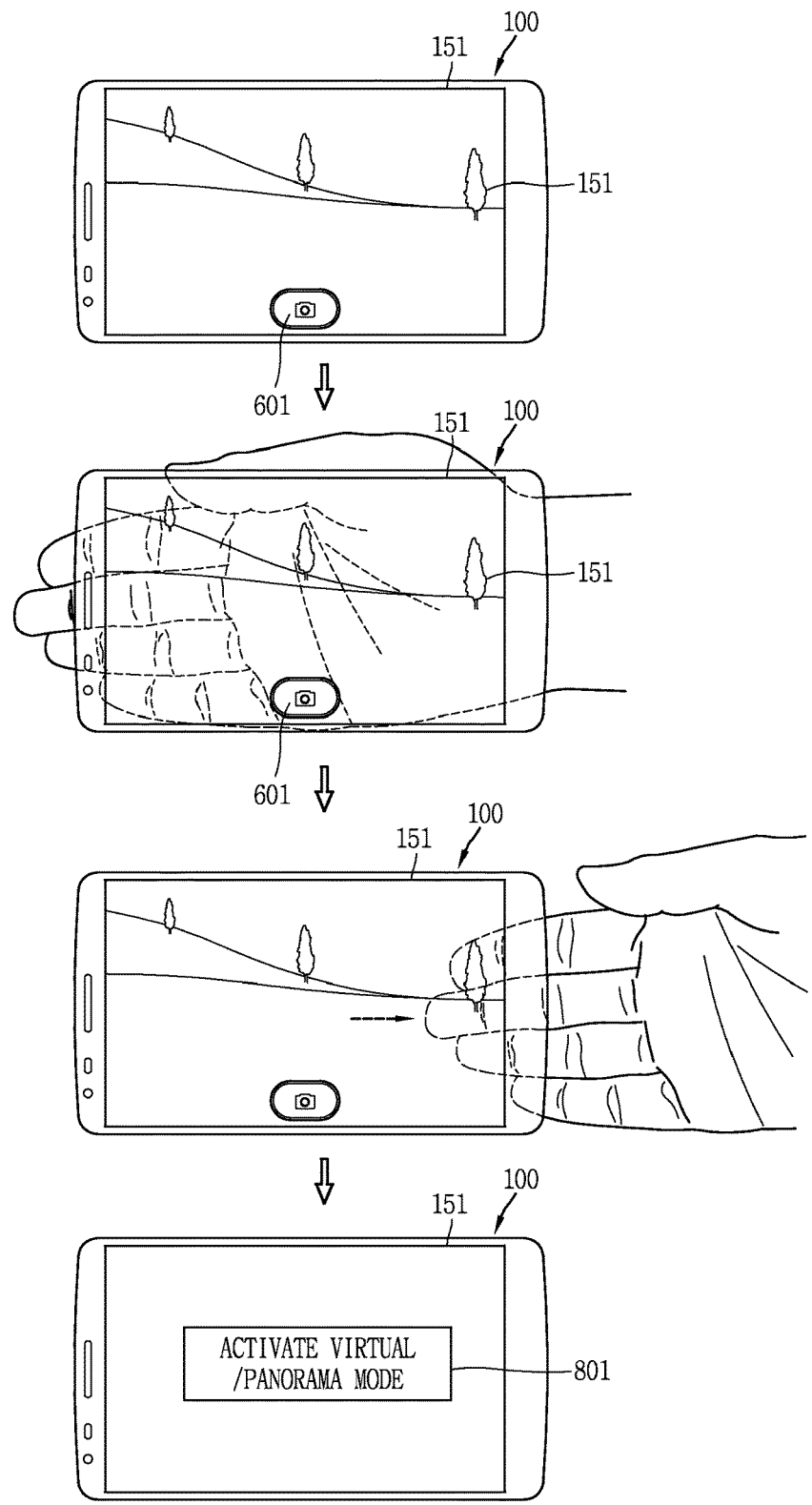
FIGS. 8A to 8E are conceptual views illustrating a control method of generating a processed image in accordance with another embodiment.

FIGS. 8A to 8E are conceptual views illustrating a control method of generating a processed image in accordance with another embodiment. In particular, FIG. 8A illustrates a control method of generating a capture control command based on a gesture sensed by an activated camera. When a palm moving in one direction is sensed while the camera is activated, the controller 180 activates a continuous capturing mode for generating the processed image.

In this instance, the controller 180 waits for an input of a capture control command. That is, the controller 180 does not store an image obtained by the camera before the capture control command is input after the palm is sensed. In addition, the controller 180 controls the camera according to the capture control command. Meanwhile, the display unit 151 outputs a notification window 801 notifying that the capturing mode has been activated.

Figure 8B:
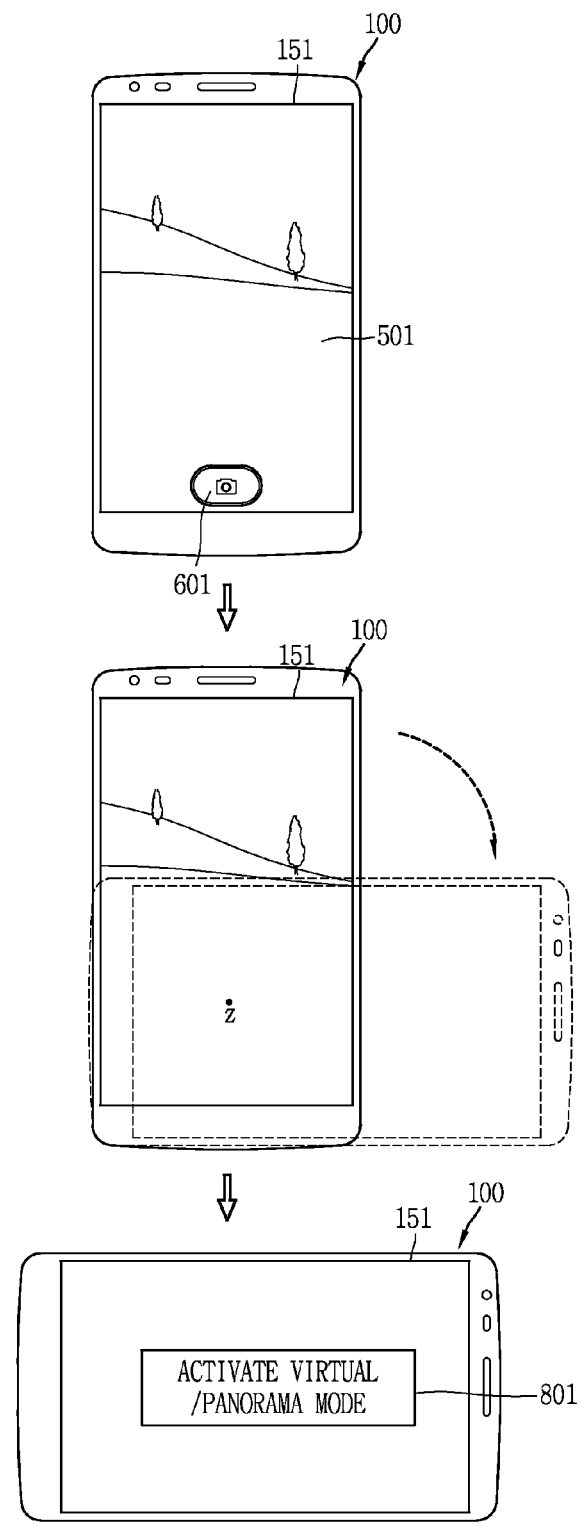

Further, FIG. 8B is a conceptual view illustrating a method of generating a control command for activating the continuous capturing mode when the main body rotates centering on a preset reference axis. The controller 180 can activate the continuous capturing mode when the rotation centering on the z-axis is sensed. For example, when a vertical mode (or a portrait mode) in which an output direction of screen information is formed in a lengthwise direction of the display unit 151 is converted into a horizontal mode (or a landscape mode) in which the output direction is formed in a widthwise direction of the display unit 151, the camera is controlled to store a plurality of images based on the motion of the main body. The display unit 151 may output the notification window 801.

Figure 8C:
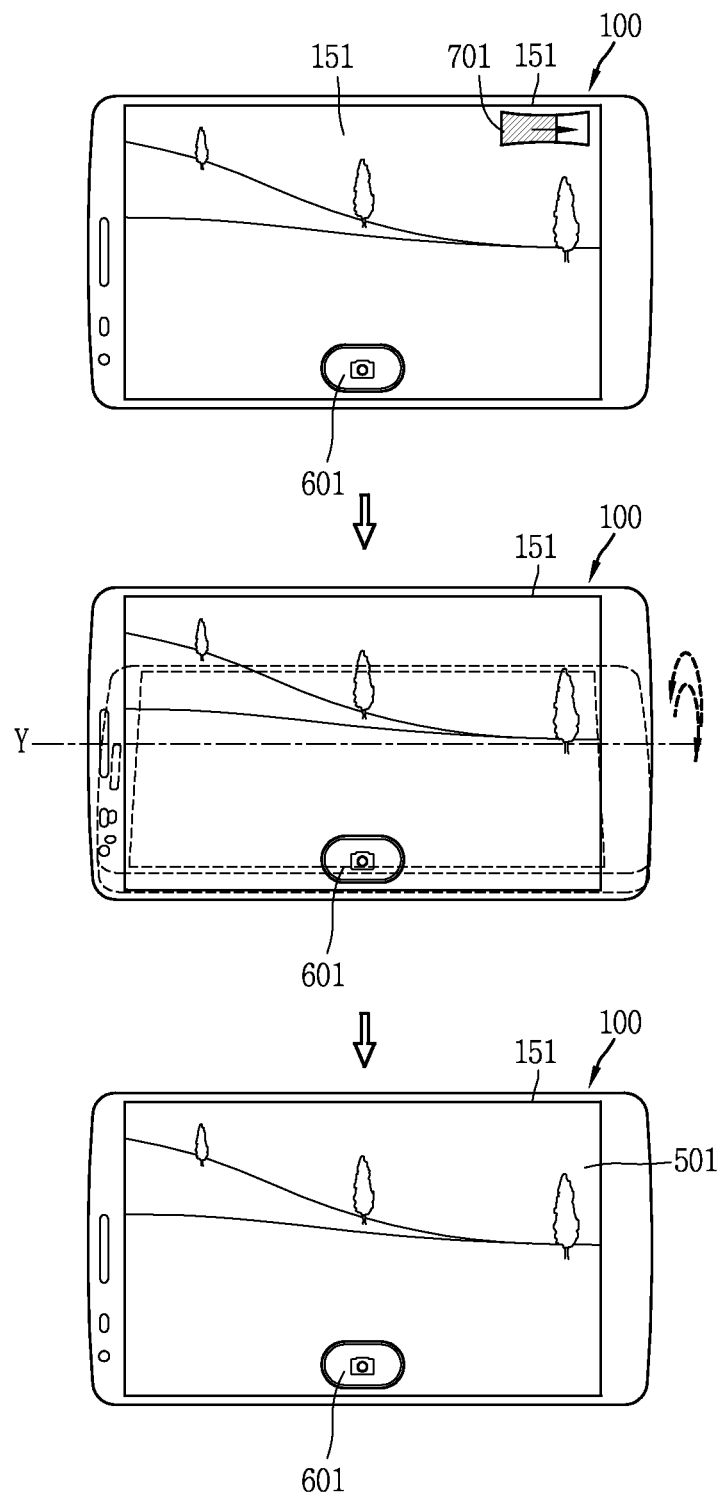

Referring to FIG. 8C, the display unit 151 displays an indicator 710 indicating the continuous capturing mode. The controller 180 releases the continuous capturing mode in response to the rotation of the main body centering on the y-axis. Further, the rotation centering on the y-axis may be made within a specific angular range. When the position of the main body is restored, the controller 180 controls the display unit 151 not to output the indicator 701 any more.

According to this embodiment, while the main body moves along a specific track, a continuous capturing mode is released based on a tilt motion in a different direction. Therefore, a user can control the continuous capturing mode without changing a position of a hand grabbing the mobile terminal or without inputting a specific control command. When the continuous capturing mode is ended, images stored in the memory 170 are deleted.

Figure 8D:
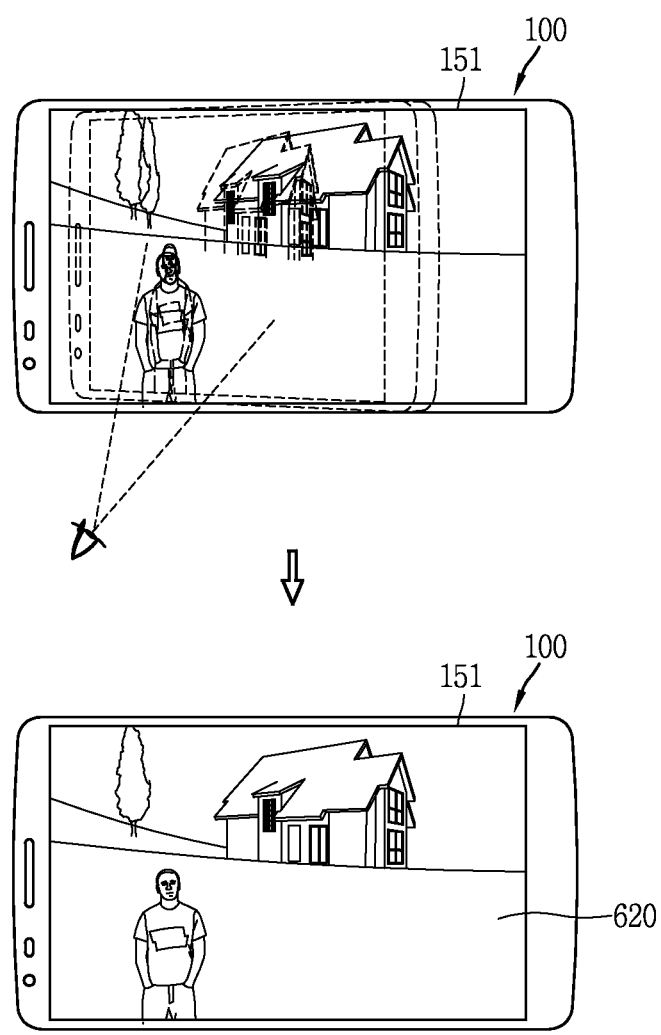
Figure 8E:
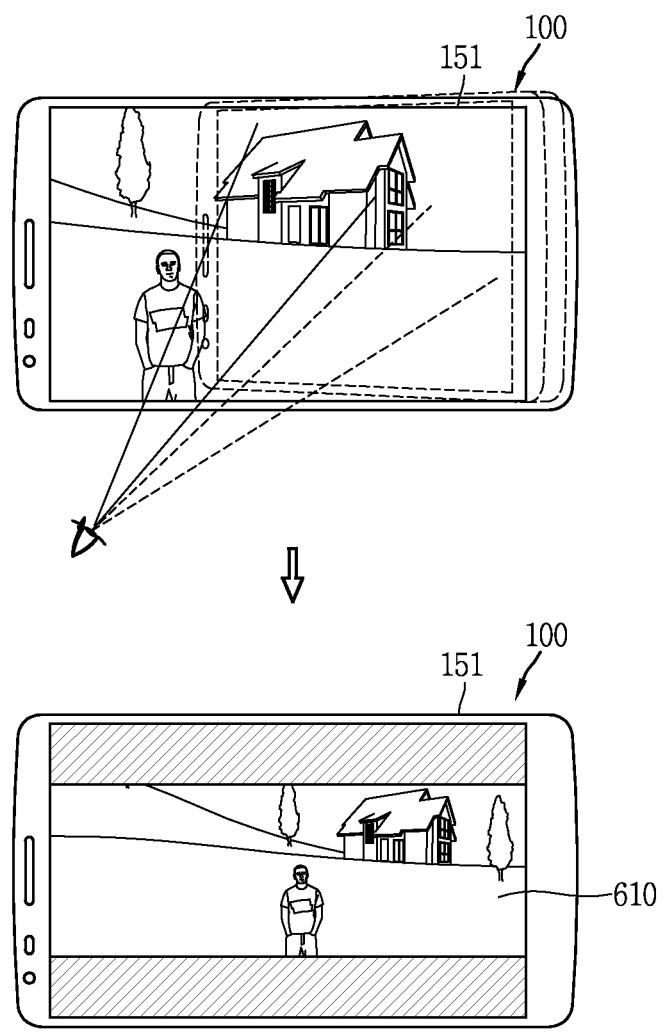

Next, FIGS. 8D and 8E illustrates a control method of generating a processed image based on a user's eyesight sensed by the first camera 121a. Referring to FIGS. 8D and 8e, while the main body moves, the controller 180 activates the first camera 121a to sense user's eyes (iris). When the user's eyes move along a specific object included in a preview image displayed on the display unit 151 by the first camera 121a, the controller 180 generates an object-oriented image 620 using a plurality of images.

Meanwhile, whiling the main body moves, when the user's eyes stay at a predetermined region of the display unit 151, the controller 180 generates a panoramic image 610 using the plurality of images. The mobile terminal according to this embodiment generates a processed image by sensing a place that the user views, without an input of a separate control command by the user.

Figure 9A:
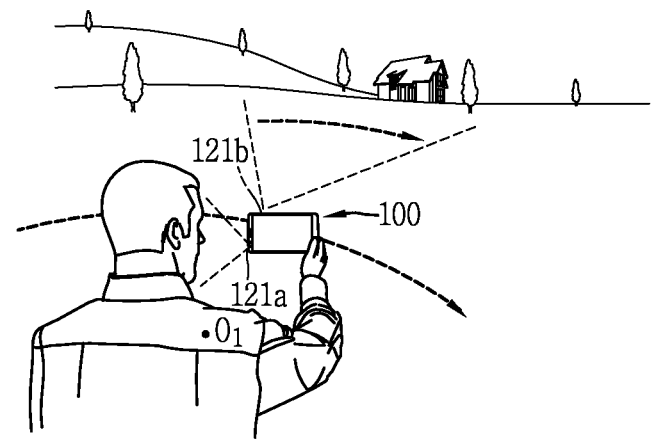
FIGS. 9A to 9C are conceptual views illustrating a control method of generating first and second processed images by first and second cameras.
Figure 9A:
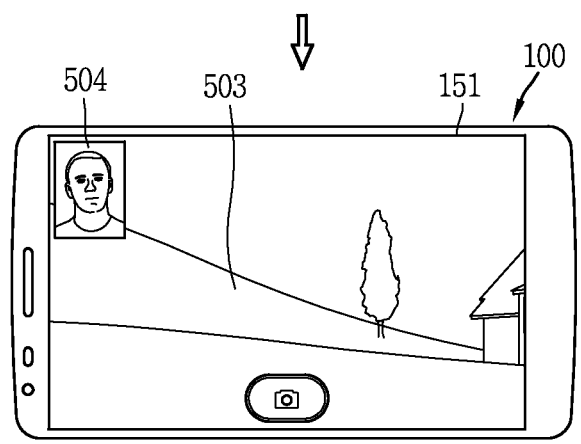
Figure 9A:
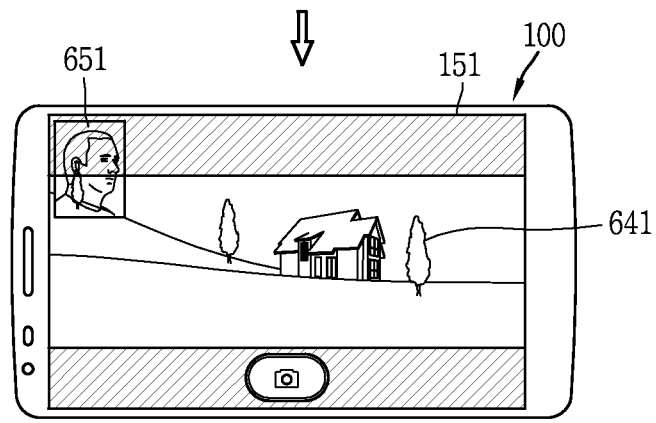
Figure 9B:
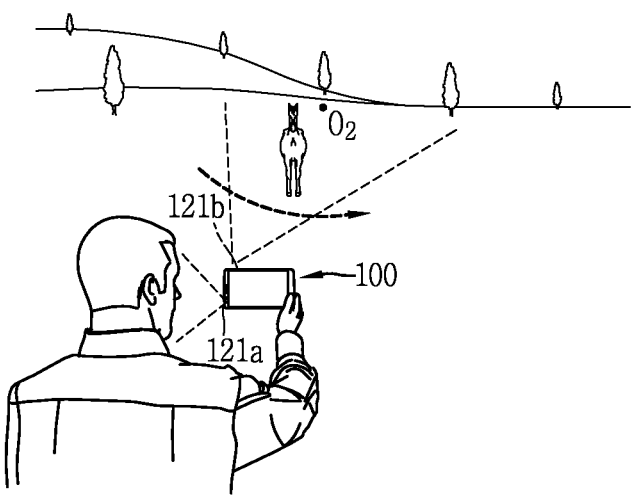
Figure 9B:
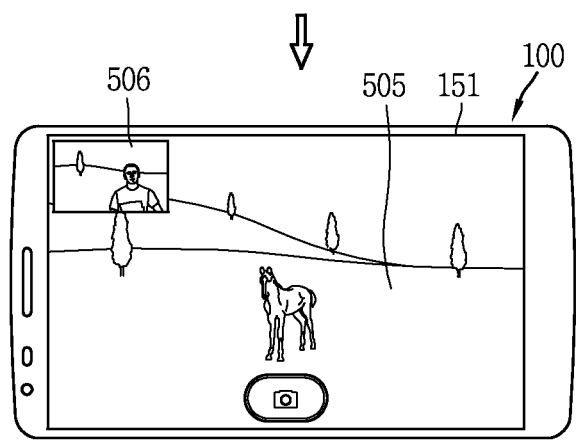
Figure 9B:
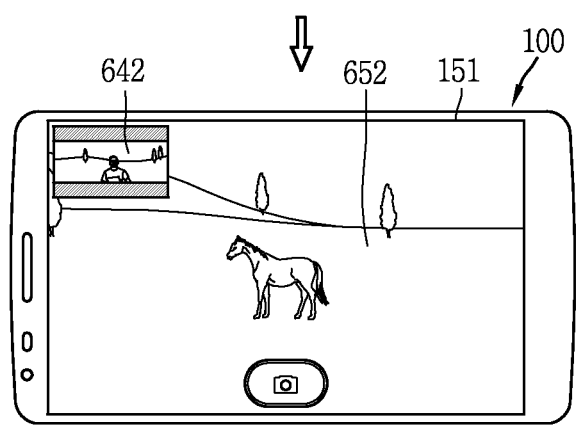
Figure 9C:
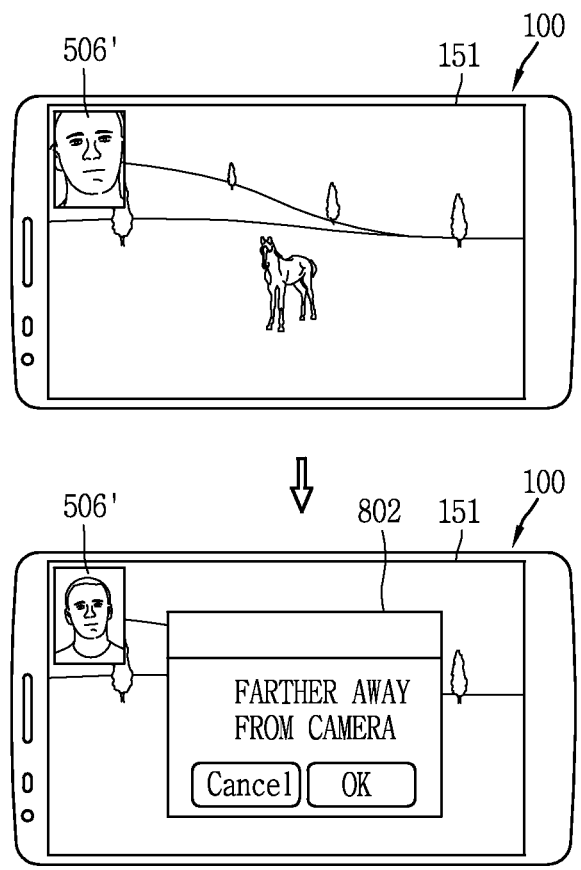

Next, FIGS. 9A to 9C are conceptual views illustrating a control method of generating first and second processed images by first and second cameras. The display unit 151 displays thereon a first preview image 503 sensed by the second camera 121b, and displays a second preview image 504 sensed by the first camera 121a on the first preview image 503.

The controller 180 also determines whether or not the central point of the virtual track is included in a capturing range of the second camera 121b, and generates an object-oriented image or panoramic image using images obtained by the second camera 121b based on a region where the central point of the virtual track. Meanwhile, when the first camera 121a is activated, the controller 180 additionally generates a panoramic image or an object-oriented image based on images obtained by the first camera 121a and a position of the central point of the virtual track. When the first camera 121a is activated while images are obtained by the second camera 121a as well as when the first and second cameras 121a and 121b are activated simultaneously, an additional processed image can be generated based on the position of the central point.

Referring to FIG. 9A, when the central point of the virtual track of the main body is included in a capturing region of the second camera 121b, the controller 180 displays an object-oriented image 652, which is formed by images captured by the second camera 121b, as a first processed image 505. The first processed image 505 may be displayed on an entire region of the display unit 151.

When the first camera 121a is activated, the controller 180 generates a panoramic image 642 using the images captured by the first camera 121a. For example, a second processed image 506 which is formed into the panoramic image may correspond to a surrounding region (background) of the user's face which supports the mobile terminal. Also, an output position of the second processed image 506 is substantially the same as the output position of the second preview image 504. The controller 180 can display on the display unit 151a combined image of the first and second processed images 505 and 506.

Referring to FIG. 9B, when the central point of the virtual track formed by the motion of the main body is not included in the capturing region of the second camera 121b, the controller 180 generates a panoramic image using images obtained by the second camera 121b. In this instance, the controller 180 generates a second processed image 504 corresponding to an object-oriented image 651 using the images captured by the first camera 121a. The object included in the second processed image 504 may correspond to the user's face. Also, the controller generates the first processed image 503 as the panoramic image 641 using the images captured by the second camera 121b.

The second processed image 504 may be displayed on one region of the first processed image 503. The foregoing description has been given based on the second camera 121b, but the present invention is not limited to this. When the user performs capturing without viewing the display unit 151, capturing may be performed using the first camera 121a.

Referring to FIG. 9C, when it is sensed that the main body moves with forming a virtual track while both of the first and second cameras 121a and 121b are activated, the controller 180 can sense a distance between the first camera 121a and the user. When the distance between the first camera 121a and the user is shorter than a preset reference distance, the controller 180 controls the display unit 151 to output an alert window 802 to warn the close distance. The alert window 802 may include text information requesting for increasing the distance between the user and the first camera 121a.

According to this embodiment, the user can generate an image by capturing his own figure (figure, appearance) while capturing an external environment using the second camera.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
   a main body;
   a camera mounted in the main body and configured to capture an external environment;
   a display configured to display an image obtained by the camera in real time;
   a sensor configured to sense a motion of the main body while the camera is activated;
   a memory configured to store therein the image displayed on the display in response to a capture control command being applied; and
   a controller configured to generate a processed image formed by continuous images displayed on the display when the motion of the main body forms a continuous virtual track while displaying the image,
   wherein the processed image corresponds to an object-oriented image obtained by capturing a specific object included in the image at multiple angles, or a panoramic image obtained by capturing the external environment in one direction, and
   wherein the controller is further configured to:
   determine whether a virtual central point of the virtual track is included in a capturing range of the camera based on a capturing direction of the camera, and
   generate the object-oriented image when the virtual central point is included in the capturing range, and
   generate the panoramic image when the virtual central point is not included in the capturing range.

2. The terminal of claim 1, wherein the controller is further configured to:
   store the image together with information related to the continuous virtual track.

3. The terminal of claim 1, wherein the controller is further configured to:
- activate a continuous capturing mode for generating the processed image using the continuous images when the motion of the main body moves in the continuous virtual track while displaying the image, and
- display an indicator corresponding to the continuous capturing mode on the display.

4. The terminal of claim 3, wherein the controller is further configure to store the image displayed on the display, independent of the processed image, in response the capture control command being applied while the main body moves in the continuous virtual track.

5. The terminal of claim 4, wherein the controller is further configured to display the independently-stored image on the processed image.

6. The terminal of claim 3, wherein the controller is further configured to terminate the continuous capturing mode when the main body moves out of the continuous virtual track.

7. The terminal of claim 3, wherein the controller is further configured to terminate the continuous capturing mode when the main body rotates centering on a preset rotation axis passing through the main body.

8. The terminal of claim 3, wherein the controller is further configured to generate the processed image only when a touch is applied to the indicator.

9. The terminal of claim 1, wherein the controller is further configured to generate the processed image when the sensor senses a rotation of the main body centering on a preset rotation axis passing through an inside of the main body.

10. The terminal of claim 1, wherein the controller is further configured to display a guide line on the display for guiding the motion of the main body, so as to generate an object-oriented image obtained by capturing an object included in the image at multiple angles, in response a touch being applied to the object included in the image.

11. The terminal of claim 1, wherein the controller is further configured to generate an object-oriented image for an object when the same object is included in the image.

12. The terminal of claim 1, wherein the controller is further configured to: display a composite image obtained by combining the panoramic image and the object-oriented image on the display, and change an image corresponding to the object using the object-oriented image in response to a touch being applied to the object included in the composite image.

13. The terminal of claim 12, wherein the controller is further configured to change one portion of the composite image using the panoramic image in response to the touch being applied.

14. The terminal of claim 1, wherein the camera includes a front camera configured to sense a user's eyes while the main body moves, and
- wherein the controller is further configured to generate the processed image based on the motion of the main body, the image output on the display and information related to the user's eyes.

15. The terminal of claim 1, wherein the main body comprises a front surface with the display disposed thereon, and a rear surface facing the front surface,
- wherein the camera comprises a first camera module disposed on the front surface, and a second camera module disposed on the rear surface, and
- wherein the controller is further configured to generate an object-oriented image obtained by capturing a specific object or a panoramic image obtained by capturing the external environment in one direction, by using images captured by the first and second camera modules.

16. A method of controlling a mobile terminal, the method comprising:
- obtaining an external environment by a camera of the mobile terminal;
- displaying an image captured by the camera in real time on a display of the mobile terminal;
- sensing, via a sensor of the mobile terminal, a motion of the main body while the camera is activated;
- storing, in a memory, the image output on the display in response to a capture control command being applied;
- generating, via a controller of the mobile terminal, a processed image formed by continuous images displayed on the display when the motion of the main body forms a continuous virtual track while displaying the image, wherein the processed image corresponds to an object-oriented image obtained by capturing a specific object included in the image at multiple angles, or a panoramic image obtained by capturing the external environment in one direction;
- determining whether a virtual central point of the virtual track is included in a capturing range of the camera based on capturing direction of the camera;
- generating the object-oriented image when the virtual central point is included in the capturing range; and
- generating the panoramic image when the virtual central point is not included in the capturing range.

* * * * *